(12) United States Patent
Stark et al.

(10) Patent No.: US 11,007,851 B2
(45) Date of Patent: May 18, 2021

(54) AIR NOZZLE DEVICE FOR A VEHICLE

(71) Applicant: Ningbo Geely Automobile Research & Development Co., Ltd., Ningbo (CN)

(72) Inventors: Richard Stark, Gothenburg (SE); Christian Cyrulewski, Vargön (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 265 days.

(21) Appl. No.: 16/292,795

(22) Filed: Mar. 5, 2019

(65) Prior Publication Data
US 2019/0193526 A1 Jun. 27, 2019

Related U.S. Application Data

(63) Continuation of application No. PCT/CN2017/101167, filed on Sep. 11, 2017.

(30) Foreign Application Priority Data

Sep. 13, 2016 (EP) ..................................... 16188549

(51) Int. Cl.
*B60H 1/34* (2006.01)
*F24F 13/15* (2006.01)

(52) U.S. Cl.
CPC ........... *B60H 1/3421* (2013.01); *F24F 13/15* (2013.01); *B60H 2001/3464* (2013.01); *B60H 2001/3478* (2013.01)

(58) Field of Classification Search
CPC ........ B60H 1/34; B60H 1/345; B60H 1/3414; B60H 1/3421; B60H 1/3428;
(Continued)

(56) References Cited

U.S. PATENT DOCUMENTS

| 5,873,778 A * | 2/1999 | Badenhorst ........ B60H 1/00792 454/155 |
| 2006/0223430 A1 * | 10/2006 | Shibata ................ B60H 1/3421 454/155 |
| 2007/0037505 A1 * | 2/2007 | Wang ..................... B60H 1/345 454/162 |
| 2008/0146139 A1 * | 6/2008 | Terai .................... B60H 1/3421 454/155 |

(Continued)

FOREIGN PATENT DOCUMENTS

CN 105142943 A 12/2015
DE 86 14 428 U1 7/1986
(Continued)

OTHER PUBLICATIONS

International Search Report from corresponding International Patent Application No. PCT/CN2017/101167, dated Nov. 20, 2017; 2 pages.
(Continued)

*Primary Examiner* — Vivek K Shirsat
*Assistant Examiner* — Ko-Wei Lin
(74) *Attorney, Agent, or Firm* — Tucker Ellis LLP

(57) ABSTRACT

The present invention relates to an air nozzle device (10) for a vehicle (1) comprising a housing (11) defining an interior volume and having an air inlet (12) at one side, an air discharge opening (14) at a second side and an air flow channel (18) through the housing (11) for transporting a flow of air between the air inlet and the air discharge opening, the device (10) further comprising a user-actuated manual mechanism (32), a vertical air flow directing arrangement (22) pivotably connected to said housing and configured to adjust the vertical direction of the air flow and a transverse air flow directing arrangement (24) having a first transverse air flow module (26) and a second transverse air flow module (27), said first transverse air flow module (26) and
(Continued)

said second transverse air flow module (27) being arranged spaced apart, as seen in a transverse direction (Y), and independently pivotably connected to said housing and configured to adjust the transverse direction of the air flow, wherein the device further comprises a partition (70) arranged in-between said first transverse air flow module (26) and said second transverse air flow module (27), said partition being adapted to restrict the air flow along a transverse direction (Y), and wherein said user-actuated manual mechanism (32) comprises first and second parts (32a, 32b) independently and operatively connected to said first transverse air flow module (26) and said second transverse air flow module (27), respectively. The present invention also relates to a vehicle compartment member comprising an air nozzle device.

15 Claims, 13 Drawing Sheets

(58) Field of Classification Search
CPC .... B60H 1/3435; B60H 1/3442; B60H 1/242; F24F 7/013; F24F 13/06; F24F 13/068; F24F 13/08; F24F 13/082; F24F 13/10; F24F 2221/40; F24F 2013/0616
USPC .............. 454/152–153, 155, 247–248, 289
See application file for complete search history.

(56) References Cited

U.S. PATENT DOCUMENTS

| | | | |
|---|---|---|---|
| 2013/0149952 A1* | 6/2013 | Demerath | B60H 1/3421 454/155 |
| 2015/0328959 A1* | 11/2015 | Suzuki | F24F 13/15 454/155 |
| 2016/0009163 A1* | 1/2016 | Terai | B60H 1/3421 454/155 |
| 2016/0297279 A1* | 10/2016 | Kim | B60H 1/0065 |
| 2019/0118620 A1* | 4/2019 | Lee | B60H 1/345 |

FOREIGN PATENT DOCUMENTS

| | | |
|---|---|---|
| DE | 195 11 133 C1 | 3/1996 |
| DE | 102015218309 A1 | 3/2017 |
| EP | 1712384 A2 | 10/2006 |
| JP | 1114136 A | 1/1999 |
| WO | 2016075111 A1 | 5/2016 |
| WO | 2016075112 A1 | 5/2016 |

OTHER PUBLICATIONS

Extended European Search Report from corresponding European Patent Application No. 16188549.6, dated Jan. 3, 2017; 6 pages.

* cited by examiner

AIR NOZZLE DEVICE FOR A VEHICLE

TECHNICAL FIELD

The invention relates to an air nozzle device for a vehicle. The invention also relates to a vehicle compartment member such as dashboard, door trim, arm rest, centre console, rear seat console or the like, comprising an air nozzle device. Moreover, the invention relates to a vehicle comprising a vehicle compartment member having an air nozzle device.

The invention can be arranged in a dashboard, a door trim, a rear seat console or the like. In particular, the invention can be arranged in a rear seat console and adapted to discharge and distribute air for a row of a rear seat console. Although the invention will be described in relation to a car, the invention is not restricted to this particular vehicle, but may as well be installed in other type of vehicles such as minivans, recreational vehicles, off-road vehicles, trucks, buses or the like.

BACKGROUND ART

In the field of air valves and ventilation systems, there is an increasing demand for improving the robustness and operation of the components. Ventilation systems for vehicles are increasingly complex as the demands on the degree of control of such systems increase. Heating, ventilation and air conditioning (HVAC) systems are typically used to control the environment in a vehicle such that desired interior conditions set by the operator are maintained irrespective of the exterior environment. The vehicle air ventilation system is typically connected to one or several air valves, vents, nozzles or the like in order to discharge a flow of air within a vehicle compartment. In many systems, the ventilation system is connected to the air valve via an air duct. Furthermore, the air valve is often installed in a vehicle compartment member such as a dashboard, and thereby defines the interface between the ventilation system and the vehicle compartment.

Depending on the wishes of the passenger in the vehicle, the air valve may be adjusted in the horizontal direction and/or the vertical direction in order to discharge the air from the air valve in different directions. One example of an air nozzle is disclosed in WO 2008/077655 A1, in which a con-shaped air directing member is arranged to direct the air flow from the air outlet opening. In addition, the air nozzle comprises a slider and a plug formed on the slider to cover an air inlet opening. The slider is further moveable in axial direction of the device in order to open and close the air inlet opening by means of the plug. The slider is provided with a manipulator, which is movable in the axial direction and rotational about a longitudinal axis of the slider. However, due to an increasing demand for reducing weight and size of the components making up the device and the system, it is often required to keep a balance between the functions provided by the device and the size of the air nozzle device.

Despite the activities in the field, there is a demand for an improved air nozzle device which is capable of meeting the requirements as to size and available space in a vehicle compartment member, particularly with respect to requirements of a rear seat console, while providing good adjustment possibilities to the user.

SUMMARY OF THE INVENTION

A general object of the present invention is to provide a multi-functional air nozzle device for a vehicle which is user-friendly, yet compact and robust. In particular, an object of the present invention is to provide an air nozzle device capable of discharging and distributing air to a row of a rear seat of vehicle in an efficient, yet simple manner.

This and other objects, which will become apparent in the following, are accomplished by an air nozzle device for a vehicle as defined in the accompanying independent claim. Details of some example embodiments and further optional features are recited in the associated dependent claims.

According to a first aspect of the present invention, there is provided an air nozzle device for a vehicle which comprises a housing defining an interior volume and having an air inlet at one side, an air discharge opening at a second side and an air flow channel through the housing for transporting a flow of air between the air inlet and the air discharge opening.

The device further comprises a user-actuated manual mechanism, a vertical air flow directing arrangement pivotably connected to the housing and configured to adjust the vertical direction of the air flow and a transverse air flow directing arrangement having a first transverse air flow module and a second transverse air flow module. The first transverse air flow module and the second transverse air flow module are arranged spaced apart, as seen in a transverse direction Y, and independently pivotably connected to the housing and configured to adjust the transverse direction of the air flow. Moreover, the device comprises a partition arranged in-between the first transverse air flow module and the second transverse air flow module. The partition is adapted to restrict the air flow along a transverse direction Y.

Further, the user-actuated manual mechanism comprises first and second parts independently and operatively connected to the first transverse air flow module and the second transverse air flow module, respectively. In addition, any one of the first and second parts of the user-actuated manual mechanism is configured to permit manual operation of the vertical air flow adjustment arrangement, whilst the first part and the second part are further configured to permit manual operation of the first transverse air flow module and the second transverse air flow module, respectively.

In this way, it becomes possible to provide a multi-functional air nozzle device with a configuration, as described above, which allows for an improved distribution and adjustment of the air flow at least in the transverse direction. An improved distribution and adjustment of the air flow in the transverse direction is particular useful for a rear seat of a vehicle as the air nozzle device is typically installed in the rear seat console or the thunnel console, i.e. in the centre of the vehicle.

By the configuration of having a partition arranged in-between the first transverse air flow module and the second transverse air flow module of the transverse air flow directing arrangement and the provision of having a user-actuated manual mechanism comprising first and second parts, it becomes possible to provide an optimized distribution of the air flow in the transverse direction for a given size of the device as compared to hitherto known air flow devices. The need for balancing the effects and functions with the size of the device is particularly important for devices installed in a thunnel console (or rear seat console) of a vehicle configured for discharging and distributing air to a row of a rear seat because the space within the thunnel console is limited, while the position of the thunnel console is typically fixed, i.e. adjacent the floor of the vehicle.

The air nozzle device is compact and robust in the sense that the device can be installed in a vehicle compartment member such as a rear seat console, thunnel console or the like without any further modifications of the console more than providing a space of the device, and without any further installations of a separate user-actuated mechanism since the user-actuated manual mechanism is directly connected to a part of the device and capable of being manipulated in a convenient manner by the user to effect a regulation and/or adjustment by moving the mechanism in the longitudinal, transverse and/or the vertical direction.

In addition, the device further contributes to an independent adjustment of the air flow in the vertical direction, an independent adjustment of the air flow in the transverse direction and optionally also an independent regulation of the air flow level.

As the user-actuated manual mechanism comprises the first and second parts being independently and operatively connected to the first transverse air flow module and the second transverse air flow module, it becomes possible to fine tune the individual adjustment of the first and second modules without compromising the air flow direction of the other one of the first and second modules as well as enabling independent adjustment of the vertical air flow via any one of the first and second modules.

Further, by the configuration of the device, it becomes possible to move each one of the first transverse air flow module and the second transverse air flow module in both directions along the transverse direction, thus providing an increased flow of air towards a certain region of e.g. the rear seat when desired by the user.

Moreover, it is believed that the device according to example embodiments is less complicated to manufacture, thus typically less expensive to manufacture, compared to other vehicle air flow devices.

Typically, the partition is an essentially vertical elongated member extending from an inner upper housing surface to an inner lower housing surface. By way of example, the partition is made of an air-tight material, such as a plastic material, thin metal material or the like. By way of example, the partition is defined by a length L extending in a horizontal direction X from a position defined by the pivotable connections of the first and second transverse air flow modules, to the housing and towards the vertical air flow adjustment arrangement.

In one example embodiment, each one of the first and second transverse air flow modules comprises a set of spaced apart air directing elements pivotably movable between transverse outermost positions upon movement of a corresponding part of the first part and the second part of the user-actuated manual mechanism, and at least one air directing element from each set of the spaced apart air directing elements is configured to establish an essentially air-tight contact with the partition when a corresponding part of the first part and said second part of the user-actuated manual mechanism is moved to an outermost position away from the partition.

Typically, although not strictly required, the first part of the user-actuated manual mechanism is operatively connected to the first transverse air flow module by means of a first linkage assembly and the second part is connected to the second transverse air flow module by means of a second linkage assembly.

In one example embodiment, the first linkage assembly and the second linkage assembly is operatively connected to the first part and the second part of the user-actuated manual mechanism, respectively, at one end and further configured to define a channel or groove to accommodate a part of a guiding member of a corresponding transverse air flow module. In addition, the channel or groove extends at least partly in the longitudinal direction X to permit movement of a corresponding linkage assembly along the longitudinal direction X independently of the position of the vertical air flow directing arrangement and the position of the transverse air flow directing arrangement, whilst an adjustment of the first and second transverse air flow modules of the vertical air flow directing arrangement is effected by a movement of the first and second linkage assemblies in the transverse direction Y, respectively.

In one example embodiments, the vertical air flow directing arrangement comprises a first module and a second module. The first module is configured to move relative said second module along the longitudinal direction X. In addition, the user-actuated manual mechanism is slidably engaged to the first module and configured to be movable along the transverse direction Y relative the first module upon operation of a user. By way of example, the user-actuated manual mechanism is movable in-between outermost transverse positions disposed on the first module of the vertical air flow directing arrangement.

In one example embodiment, the device further comprises a shutoff mechanism configured to regulate the air flow.

In one example embodiments, the device further comprises a third moveable linkage assembly, wherein the third moveable linkage assembly is operatively connected to the user-actuated manual mechanism and configured to effect a regulation of the air flow via the shutoff mechanism by a movement of the user-actuated manual mechanism along the longitudinal direction X.

By way of example, the third linkage assembly is operatively connected to the user-actuated manual mechanism via the first module of the vertical air flow directing arrangement and configured to effect a regulation of the air flow via the shutoff mechanism by a movement of the user-actuated manual mechanism and the first module along the longitudinal direction X.

Typically, the third linkage assembly is configured to adjust the position of the shutoff mechanism upon a movement of the third linkage assembly in the longitudinal direction X, and further configured to remain in position, as seen in the longitudinal direction X, upon an adjustment of any one of the first and second linkage assemblies in the transverse direction Y and/or in a vertical direction Z.

In one example embodiment, the third linkage assembly comprises a movable linkage member and a guiding member connected to the housing. The linkage member is adapted at a first end to cooperate with the guiding member of the third linkage assembly and at a second end to cooperate with the shutoff mechanism so that a movement of the first module of the vertical air flow directing arrangement is transferred into a movement of the linkage member of the third linkage assembly along the longitudinal direction X to effect a regulation of the air flow by the shutoff mechanism.

In one example embodiment, the vertical air flow directing arrangement further comprises an interconnecting member for connecting said first module and the second module of the vertical air flow directing arrangement.

Typically, the vertical air flow directing arrangement is configured for adjusting the air flow in the vertical direction Z and the transverse air flow directing arrangement is configured for adjusting the air flow in the transverse direction Y.

By a manipulation of the user-actuated manual mechanism, a user is capable of independently adjusting the vertical air flow directing arrangement by a movement of the user-actuated manual mechanism along the vertical direction Z, independently adjusting the first transverse air flow module of the transverse air flow directing arrangement by a movement of the first part of the user-actuated manual mechanism and the first linkage assembly along the transverse direction Y, independently adjusting the second transverse air flow module of the transverse air flow directing arrangement by a movement of the second part of the user-actuated manual mechanism and the second linkage assembly along the transverse direction Y, and independently regulating the air flow via the shutoff mechanism by a movement of the user-actuated manual mechanism and the third linkage assembly along the longitudinal direction X.

When the device comprises the shutoff mechanism, the device provides an air nozzle device which is capable of regulating the air flow between a closed position to an open position in all available positions of the transverse air flow directing arrangement and the vertical air flow adjustment arrangement. In other words, the vertical air flow adjustment and the transverse air flow adjustment can be controlled independently of the position of the air regulation mechanism, i.e. the shutoff mechanism.

In addition, the example embodiments of the device provide the possibility of installing the air nozzle device either in a circular cross-sectional housing or in a rectangular cross-sectional housing. To this end, the device provides a multi-functional solution which is both compact and robust while allowing for an integrated push/pull function via the user-actuated manual mechanism that is operable from the outside of the device.

In one example embodiment, the user-actuated manual mechanism is slidably engaged to the first module of the vertical air flow directing arrangement and configured to be movable along the longitudinal direction X and the transverse direction Y upon operation of a user. Typically, the user-actuated manual mechanism is also configured to pivot about a transverse axis in order to adjust the vertical air flow directing arrangement. Hence, the user-actuated manual mechanism is also configured to be movable in the vertical direction Z.

As an example, the user-actuated manual mechanism is slidably engaged to the vertical air flow adjustment arrangement and movable along the longitudinal direction X and the transverse direction Y upon operation of a user.

In one example embodiment, the user-actuated manual mechanism is slidably engaged to the vertical air flow directing arrangement to permit operation of the user-actuated manual mechanism along the longitudinal direction X and the transverse direction Y, upon operation of a user, independently of the position of the vertical air flow directing arrangement, while an adjustment of the vertical air flow directing arrangement is effected by a movement of the user-actuated manual mechanism in the vertical direction Z, typically referring a rotation of the user-actuated manual mechanism about a transverse axis.

In one example embodiment, the first linkage assembly is arranged spaced apart from the second linkage assembly within said housing as seen in the transverse direction Y.

In an example embodiment, the shutoff mechanism is configured to move between an open position, defining a passage for the air flow in the air flow channel, and a closed position, defining an essentially air tight configuration against (or with) the inner surfaces of the housing, upon a movement of the third linkage assembly in the longitudinal direction.

In other words, the shutoff mechanism is typically operable between an open position, in which essentially all air upstream from the shutoff mechanism passes through the shutoff mechanism, and a closed position, in which the shutoff mechanism forms an air tight configuration with an inner surface of the housing, upon movement of the third linkage assembly in the longitudinal direction X.

In an example embodiment, the shutoff mechanism is connected to the housing. As an example, the shutoff mechanism is pivotably connected to the housing. The shutoff mechanism can be pivotably connected to the housing by means of a rotational arranged supporting member extending between shutoff mechanism and the inner surface of the housing. Typically, the shutoff mechanism is connected to the housing via at least one pivoting connection configured to permit said shutoff mechanism to pivot about one or several transverse pivot axis.

In an example embodiment, the shutoff mechanism comprises a set of blades being moveable between an open position in which the set of blades forms a passage for the air flow in the air flow channel and a closed position in which the set of blades are adapted to form an essentially air tight configuration against (or with) the inner surfaces of the housing.

Typically, the user-actuated manual mechanism is capable of open/close the shutoff mechanism via a movement of the third linkage assembly and the first module of the vertical air flow directing arrangement along the longitudinal direction X.

In some example embodiments, the first part and the second part of the user-actuated manual mechanism are adapted to be movable arranged relative each other. Typically, although not strictly required, the first part and the second part are adapted to be separable relative each other. By way of example, the first part and the second part are movable relative each other in the transverse direction. Typically, although not strictly required, the first part and the second part are separable relative each other at least in the transverse direction.

Hence, in some example embodiments, there is provided a user-actuated manual mechanism comprising separable first and second parts being independently and operatively connected to the first transverse air flow module and the second transverse air flow module.

The invention also relates to a vehicle compartment member such as dashboard, door trim, arm rest, thunnel console, centre console, rear seat console or the like, wherein the vehicle compartment member comprises an air nozzle device according to the aspect and/or any one of the example embodiments as mentioned above with respect to the first aspect of the invention, i.e. the aspects relating to the air nozzle device.

In one example embodiment, the vehicle compartment member is a rear seat console, wherein the air nozzle device is adapted to discharge and distribute air for a row of a rear seat of a vehicle.

The invention also relates to a vehicle comprising a vehicle compartment member according to any one of the aspects and/or example embodiments as mentioned above with respect to the vehicle compartment member and/or the first aspect of the invention, i.e. the aspect relating to the air nozzle device.

By the term "operatively connected" means that a component is in operative relation to another component.

Further features of, and advantages with, the present invention will become apparent when studying the appended claims and the following description. The skilled person realize that different features of the present invention may be combined to create embodiments other than those described in the following, without departing from the scope of the present invention. As an example, the vertical air flow directing arrangement and the transverse air flow directing arrangement may be provided as an integral air flow adjustment assembly.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1:
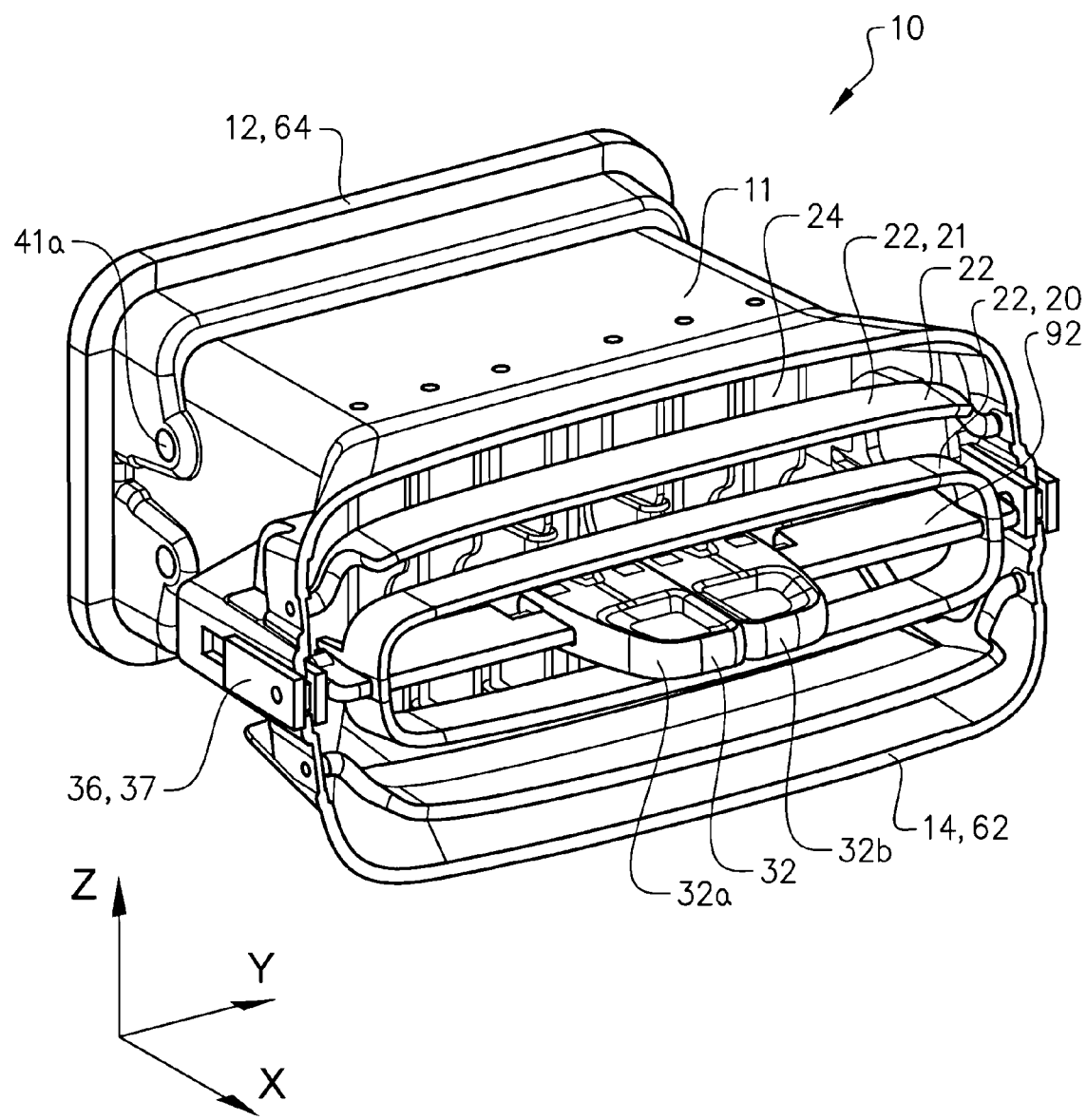
FIG. 1 is perspective view of a first example embodiment of an air nozzle device for a vehicle according to the present invention, wherein the air nozzle device is in an assembled configuration.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Referring now to the figures and FIG. 1 and FIGS. 2a-2c in particular, there is depicted a vehicle air nozzle device to be installed in a vehicle compartment member in the form of a rear seat console of a vehicle such as a car. Accordingly, the vehicle compartment is provided with an air nozzle device according to an example embodiment, as described hereinafter. The vehicle 1 (not shown) thus includes the vehicle compartment member in the form of a rear seat console 100 (not shown) provided with an air nozzle device 10. By way of example, the device 10 is here adapted to discharge and distribute air for a row of a rear seat of a vehicle. The air nozzle device 10 is described in further detail below with reference to FIG. 1, FIGS. 2a-2c, FIGS. 3-6. The vehicle 1 is provided in the form of a car. Moreover, the rear seat console 100 is arranged in a vehicle compartment of the car. The arrangement, components and functions of the rear seat console are well-known in the art, and are therefore not further described herein. In addition, it should be readily appreciated that an rear seat console is only one example of several different vehicle compartment members, and it is therefore possible that the invention can be installed and arranged in other vehicle compartment members such as in an instrument panel, a door trim, an arm rest, a rear end of a floor console, B-pillar, tunnel console or the like. In addition, the vehicle compartment member can be arranged and installed in any type of vehicle such as a truck, bus and the like.

Figure 2A:
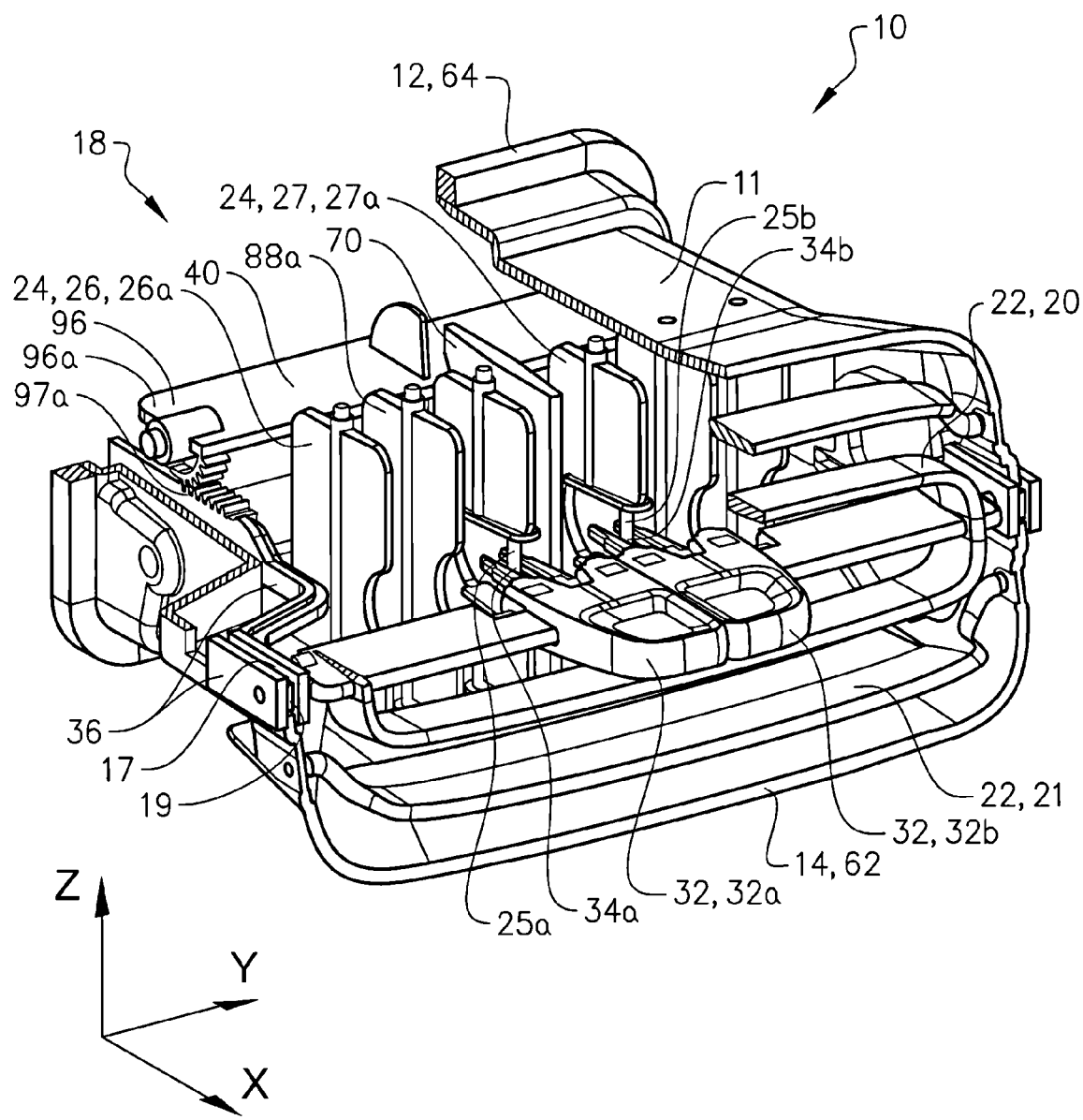
FIGS. 2a and 2b are isometric views of a partial section of the first example embodiment of the air nozzle device in FIG. 1, wherein the air nozzle device is in an assembled configuration.
Figure 2B:
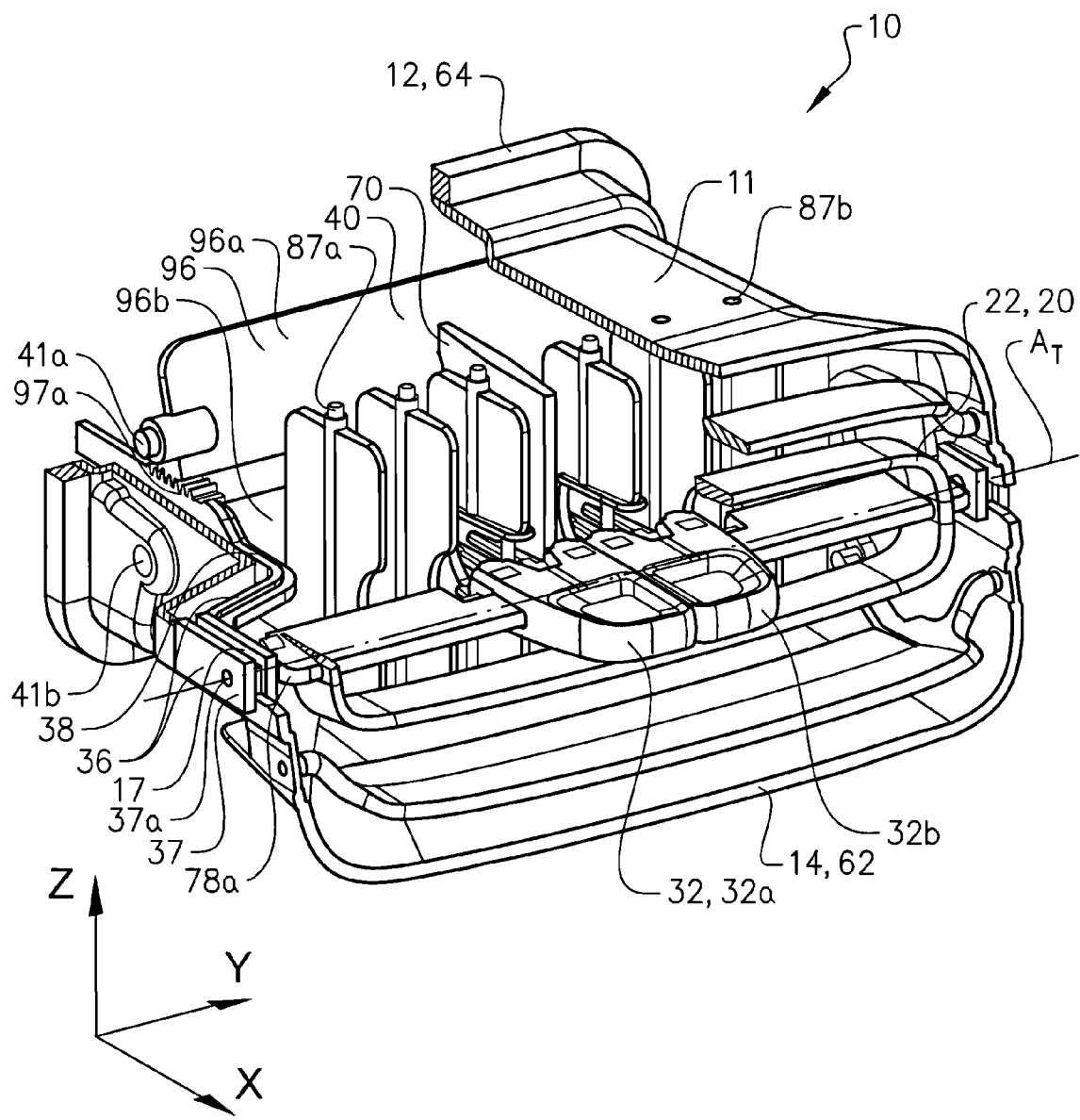
Figure 2C:
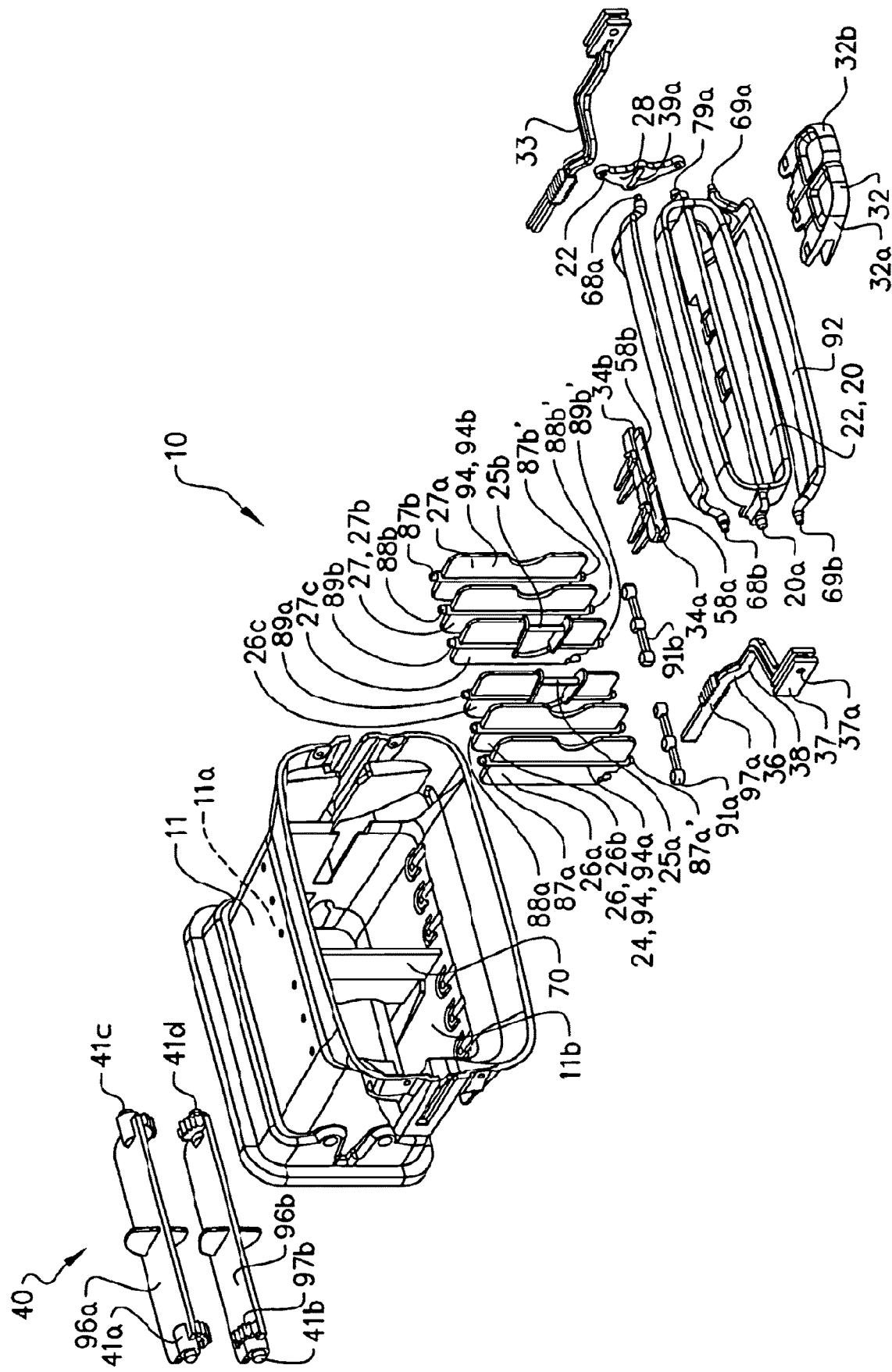
FIG. 2c is an exploded view of the first example embodiment of the air nozzle device in FIGS. 1 and 2a to 2b.
Figure 3:
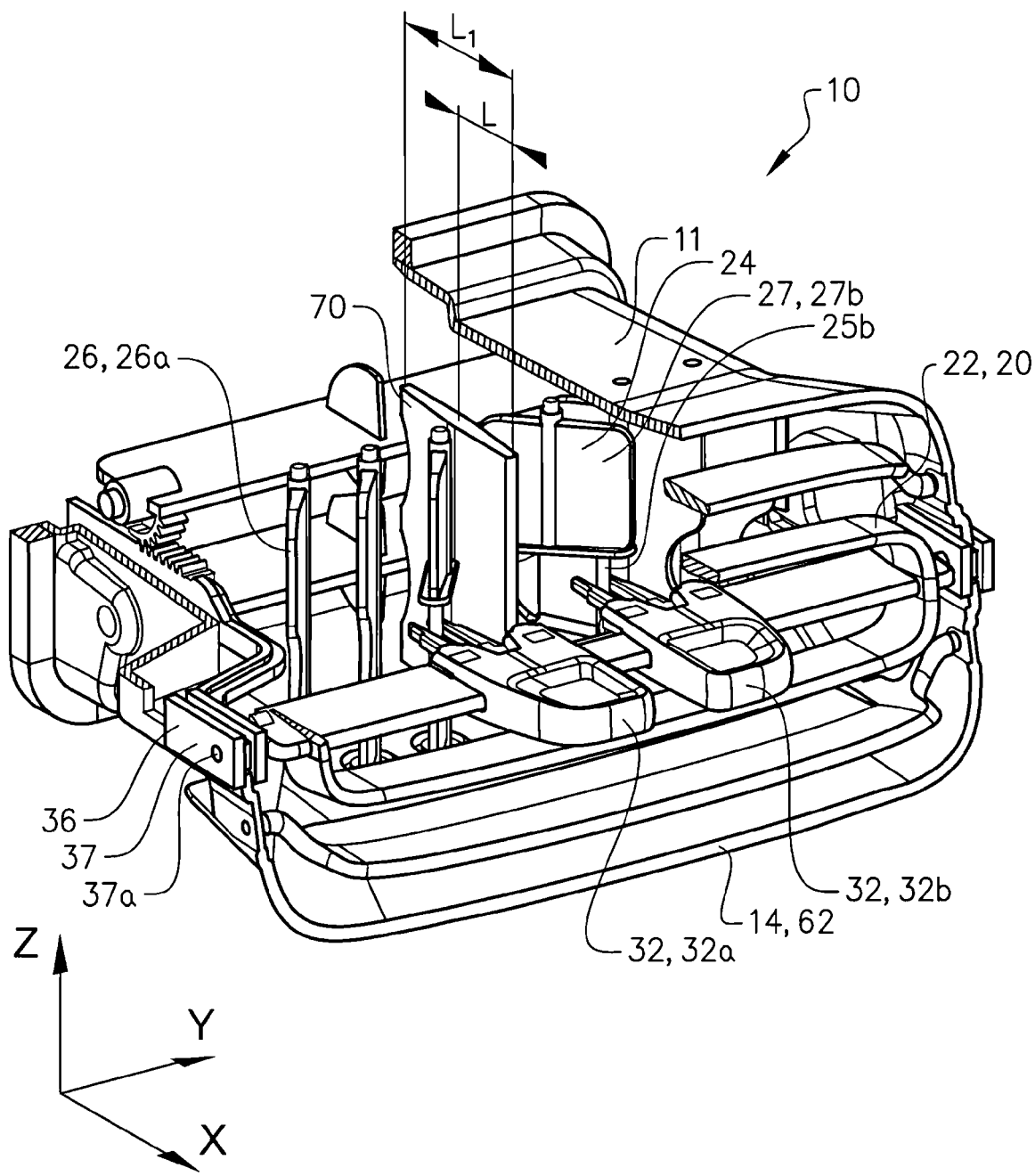
FIG. 3 illustrates the first example embodiment of the air nozzle device in an operational state, in which a shutoff mechanism for regulating the air flow is in an open position, a vertical air flow adjustment arrangement for adjusting the air flow in a vertical direction Z is in a nominal position and a transverse air flow directing arrangement comprising two air flow modules for adjusting the air flow in a transverse direction Y are adjusted into two outer transverse positions, respectively.

Turning now to FIGS. 1 and 2a to 2c, an example embodiment of an air nozzle device of a vehicle is illustrated. FIG. 1 is a perspective view of the device according to example embodiments, while FIGS. 2a and 2b are isometric views of partial sections of the example embodiment of the air nozzle device. In FIGS. 1 and 2a-2b, the air nozzle device is in an assembled configuration, while FIG. 2c shows an exploded view of the components of the example embodiment of the air nozzle device, i.e. a disassembled configuration of the device.

In this example embodiment, as shown in FIGS. 1-2c, the air nozzle device 10 comprises a housing 11 defining an interior volume. The interior volume may have an inner surface extending in the direction X, Y and Z. Thus the housing here is defined by an inner surface. The inner surface is typically encircling at least a part of an air flow channel 18 extending through the housing 11 (see e.g. FIG. 2a and FIGS. 4a-4d). The housing in this example embodiment has an extension in the longitudinal (horizontal) direction X, an extension in the transverse direction Y and an extension in the vertical direction Z. The device is typically installed in a horizontal orientation in the vehicle. It should be readily appreciated that the directions are only provided for ease of understanding, and refers to the directions of the device and the housing when the device is installed in an essentially plane configuration in the vehicle. In other words, the directions may not be essentially horizontal and vertical in a configuration when the device (and the housing) is installed in an angled position. Alternatively, the device can be installed in an essentially vertical orientation in the vehicle. As such, the directions should be construed to refer to the directions of the device and the air flow when the device is in an essentially plane installation in a vehicle. The shape of the housing is in this example embodiment a three-dimensional shape having an essentially rectangular shaped cross-section. Typically, the cross section as seen in any one of the xy-plane, xz-plane and in the yz-plane resembles the shape of a rectangle. However, other shapes are conceivable such as a three-dimensional shape having a circular cross-section, i.e. a cylinder. It is even possible that the shape of the housing is provided in the form of a bowl.

In all example embodiments as shown in the Figures herein, the housing has an air inlet 12 at one side 64, an air discharge opening 14 at a second side 62 and an air flow channel 18 through the housing 11 for transporting a flow of air between the air inlet 12 and the air discharge opening 14. The air inlet is typically connected to an air duct (not shown), which is connected to e.g. an air ventilation system, air conditioning system, air heating system or the like. Thus, the air nozzle device can be considered as the interface between the air ventilation system (or the air conditioning system or the air heating system) and the vehicle compartment. Accordingly, the air inlet 12 is arranged upstream of the air discharge opening 14, as seen in a longitudinal direction X. In other words, the air discharge opening is arranged downstream of the air inlet 12, as seen in a longitudinal direction X.

The air inlet 12 is configured for receipt of air from an air duct (not shown). The air discharge opening 14 is configured for discharging air into the vehicle compartment. In order to further enhance the distribution of the air into the vehicle compartment, the housing at the second side 62 may be provided with a cross-sectional shape in the XY-plane and in the XZ-plane resembling a trumpet, as seen in FIGS. 4a-d. In other words, the air discharge opening 14 may be shaped as trumpet. The air flow channel 18 is configured for transporting the flow of air through the housing 11.

As will be readily appreciated from the description herein, the air nozzle device is configured for distributing and directing a flow of air within the vehicle compartment. In addition, the air nozzle device is configured for regulating the level of air, as described below.

Moreover, the device 10 further comprises a user-actuated manual mechanism 32, a vertical air flow directing arrangement 22 pivotably connected to the housing 11 and configured to adjust the vertical direction of the air flow and a transverse air flow directing arrangement 24, as shown in FIGS. 1 and 2a-2c. The transverse air flow directing arrangement 24 comprises a first transverse air flow module 26 and a second transverse air flow module 27. The first transverse air flow module 26 and the second transverse air flow module 27 are further arranged spaced apart, as seen in the transverse direction Y. Each one of the first transverse air flow module 26 and the second transverse air flow module 27 are independently pivotably connected to the housing and configured to adjust the transverse direction of the air flow, as further described hereinafter. Hence, the vertical air flow directing arrangement 22 is pivotably connected to the housing and configured to adjust the direction of the air flow. Analogously, the transverse air flow directing arrangement 24 is pivotably connected to the housing and configured to adjust the direction of the air flow.

Further details of the user-actuated manual mechanism 32 will be described below.

Turning again to FIGS. 2a-2c, the device also comprises a partition 70 arranged in-between the first transverse air flow module 26 and the second transverse air flow module 27. The partition 70 is adapted to restrict the air flow along the transverse direction Y, which is e.g. schematically illustrated by the arrows in FIGS. 4a-4d. By way of example, the partition 70 is an essentially vertical elongated member extending from an inner upper housing surface 11a to an inner lower housing surface 11b. In this example, the partition is a separate part of the housing. The partition can e.g. be glued or connected to the housing in a suitable manner. However, the partition may likewise be an integrated part of the housing. Moreover, the partition 70 is here defined by a length L extending in a horizontal direction X from at least a position defined by the pivotable connections of the first and second transverse air flow modules 26, 27 to the housing and towards the vertical air flow adjustment arrangement 22. However, the partition typically extends a length L1 being larger than the length L. In other words, as shown in e.g. FIGS. 2a-2c, FIG. 3 and FIGS. 4a-4d, the partition 70 may in some examples be defined by the length L1 extending in a horizontal direction X from a position upstream of the pivotable connections of the first and second transverse air flow modules 26, 27 to the housing and towards the vertical air flow adjustment arrangement 22.

Turning now again to FIGS. 2a-2c and the user-actuated manual mechanism 32, the mechanism 32 comprises first and second parts 32a, 32b independently and operatively connected to the first transverse air flow module 26 and the second transverse air flow module 27, respectively. In other words, the first part 32a is independently and operatively connected to the first transverse air flow module 26, while the second part 32b is independently and operatively connected to the second transverse air flow module 27.

In addition, any one of the first and second parts 32a, 32b of the user-actuated manual mechanism 32 is configured to permit manual operation of the vertical air flow adjustment arrangement 22, while the first part 32a and the second part 32b are further configured to permit manual operation of the first transverse air flow module 26 and the second transverse air flow module 27, respectively.

In this example embodiment, the first part 32a and the second part 32b are movable relative each other. Typically, although not strictly required, the first part 32a and the second part 32b are separable relative each other. By way of example, the first part 32a and the second part 32b are movable relative each other in the transverse direction Y. Typically, although not strictly required, the first part 32a and the second part 32b are separable relative each other at least in the transverse direction. Further, in this example, the first part 32a is a separate component from the second part 32b.

By the above configuration of the user-actuated manual mechanism 32, the first part 32a and the second part 32b are adapted to be both independently movable along the transverse direction Y and partly jointly moveable along the transverse direction Y.

As illustrated in FIGS. 2a-2c, FIG. 3 and FIGS. 4a-4d, each one of the first and second transverse air flow modules 26, 27 comprises a set of spaced apart air directing elements 26A-N, 27A-N pivotably movable between transverse outermost positions upon movement of a corresponding part of the first part 32a and the second part 32b of the user-actuated manual mechanism 32.

Figure 4A:
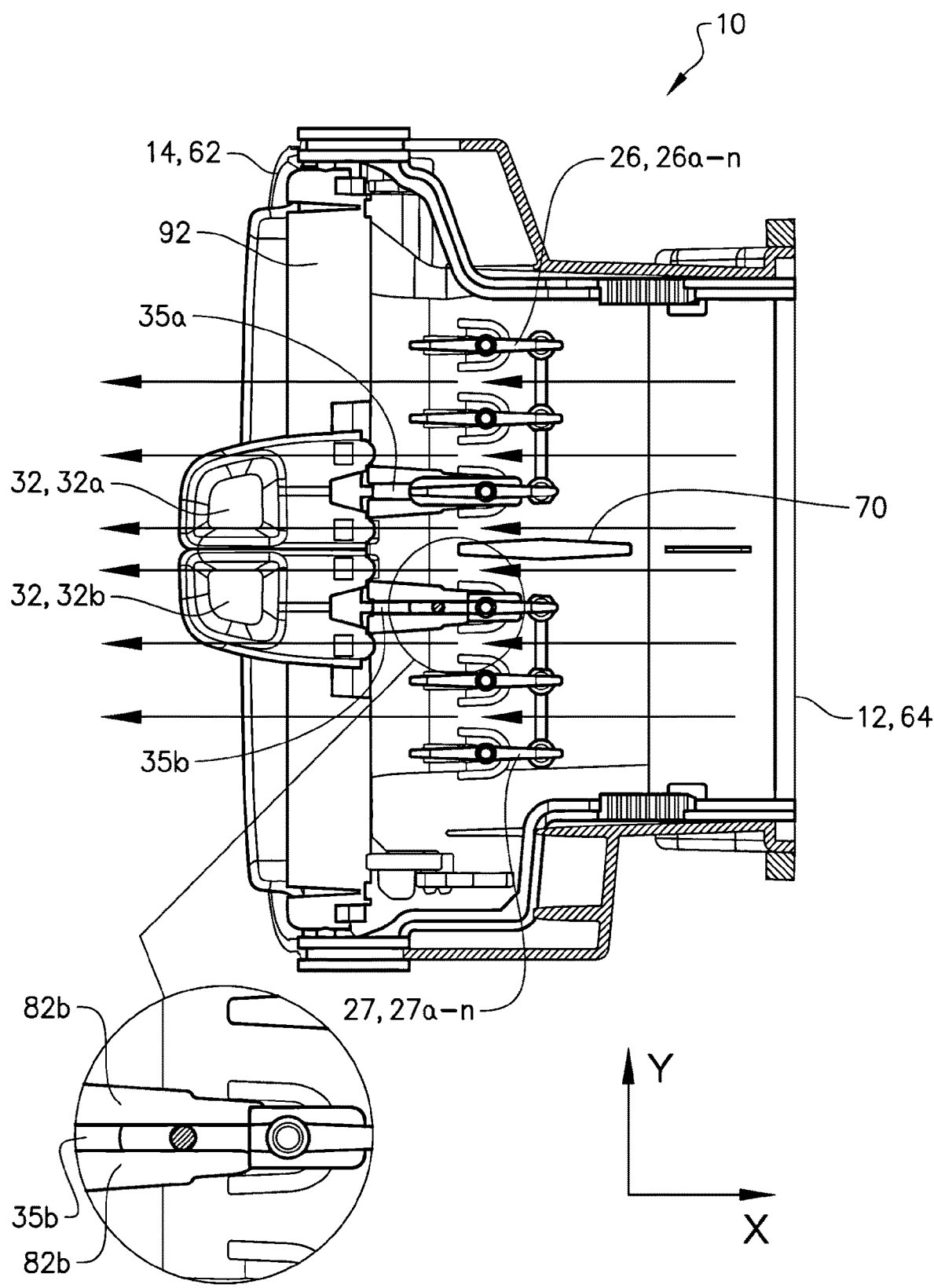
FIGS. 4a to 4d are cross sectional views along the XY-plane illustrating the first example embodiment of the air nozzle device in various operational states, in which the shutoff mechanism for regulating the air flow is in an open position, the vertical air flow adjustment arrangement for adjusting the air flow in the vertical direction Z is in the nominal position and the transverse air flow directing arrangement comprising the two air flow modules for adjusting the air flow in a transverse direction Y are adjusted into various transverse positions.
Figure 4B:
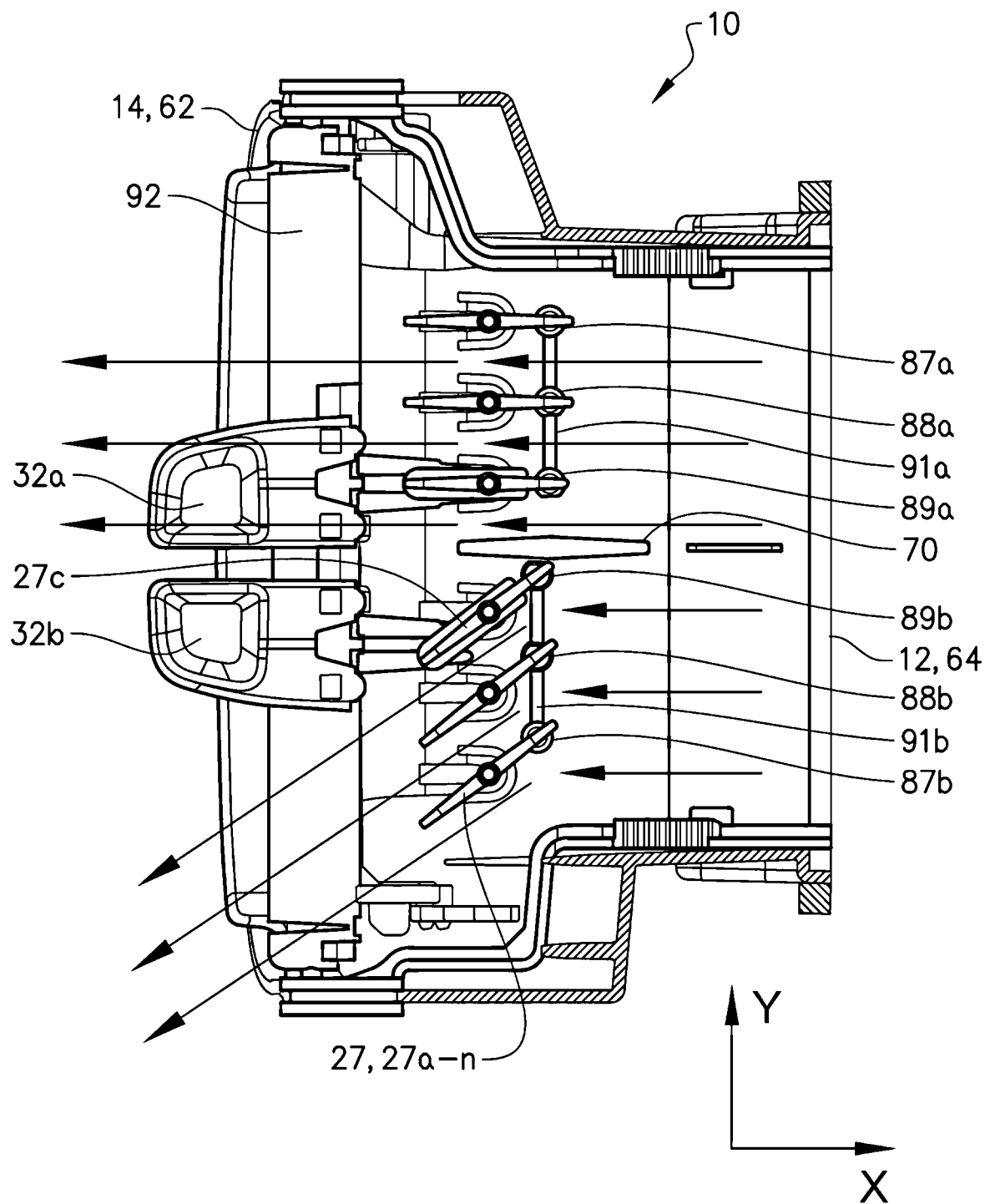

Typically, although not strictly required, at least one air directing element from each set of the spaced apart air directing elements 26A-N, 27A-N is configured to establish an essentially air-tight contact with the partition 70 when a corresponding part of the first part 32a and the second part 32b of the user-actuated manual mechanism 32 is moved to an outermost position away from the partition. By way of example, FIG. 4b illustrates an operational state of the device in which the air directing element 27C of the set of the spaced apart air directing elements 27A-N is adjusted to establish the essentially air-tight contact with the partition 70 upon a movement of the second part 32b of the user-actuated manual mechanism 32 to an outermost position away from the partition 70. In this operational state of the device, it is to be noted that the set of the spaced apart air directing elements 26A-N is maintained in a nominal state, i.e. the first transverse air flow module 26 is maintained in the nominal state. The arrows in FIG. 4b represents the direction of the air flow and indicate that the air flow through the first transverse air flow module 26 is essentially unaffected by the module 26 (i.e. the air is directed essentially in a direction parallel to direction X), while the air flow through the second transverse air flow module 27 is directed in the transverse direction Y by the adjusted set of the spaced apart air directing elements 27A-N.

Figure 4C:
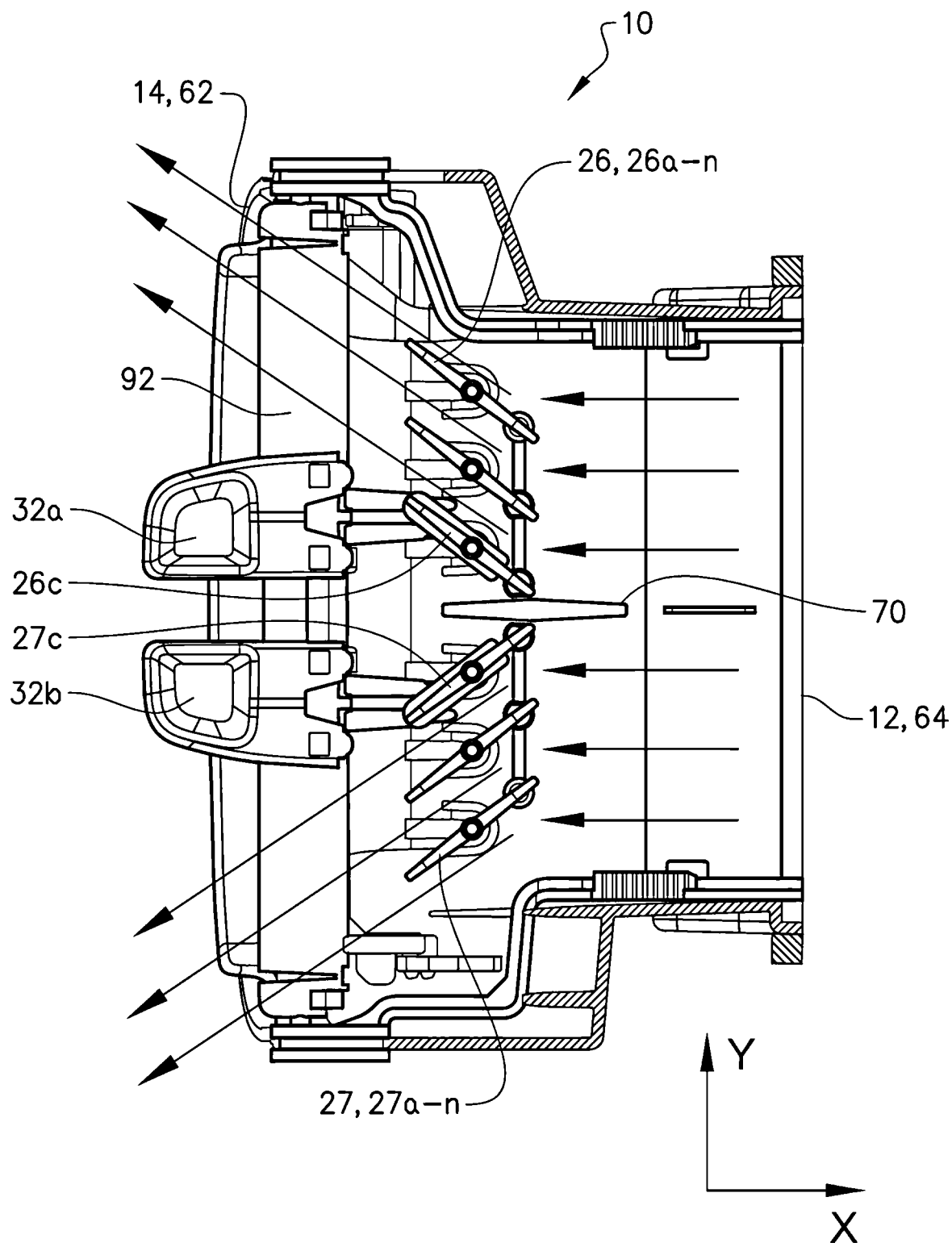

Similarly, FIG. 4c illustrates an operational state of the device in which both modules 26 and 27 are adjusted in the transverse direction. In other words, FIG. 4c shows an operational state in which the air directing element 26C of the set of the spaced apart air directing elements 26A-N is adjusted to establish the essentially air-tight contact with the partition 70 upon a movement of the first part 32a of the user-actuated manual mechanism 32 to an outermost position away from the partition 70, while the air directing element 27C of the set of the spaced apart air directing elements 27A-N is adjusted to establish the essentially air-tight contact with the partition 70 upon a movement of the second part 32b of the user-actuated manual mechanism 32 to an outermost position away from the partition 70. In this operational state of the device, the air flow through the first transverse air flow module 26 is directed in the transverse direction Y by the adjusted set of the spaced apart air directing elements 26A-N, while the air flow through the second transverse air flow module 27 is directed in the transverse direction Y with another angle by the adjusted set of the spaced apart air directing elements 27A-N.

In a configuration as shown in the Figures, e.g. in FIGS. 2a to 2c and FIG. 4b, each one of the modules 26 and 27 of the transverse air flow directing arrangement 24 is independently pivotably connected to the housing 11 via at least one pivoting connection 88a and 88b, respectively. The pivoting connection of each one of the modules 26 and 27 of the transverse air flow directing arrangement 24 is configured to permit the transverse air flow directing arrangement 24 to pivot about a vertical pivot axis or a number of vertical pivot axis, as illustrated in the figures. Typically, the pivoting connection of the transverse air flow directing arrangement 24 includes a set of pivoting points at opposite vertical sides of the arrangement 24, as shown in FIGS. 2a to 2c. Although strictly not necessary, the transverse air flow directing arrangement 24 is in this example pivotably connected to the housing 11 via a plurality of pivoting connections 87a and 87b, 88a, 88b, 89a and 89b defining a plurality of pivoting points 87a, 87a'; 88a, 88a'; 89a, 89a', 87b, 87b'; 88b, 88b'; 89b, 89b'. As an example, the pivoting connections may include a set of three vertical opposite arranged pivoting points arranged spaced apart in the transverse direction, as shown in e.g. FIGS. 2a to 2c or FIG. 4b. In addition, the pivoting points of the pivoting connections are arranged on opposite vertical sides of the arrangement 24.

Referring again to FIGS. 2a to 2c, each one of the modules 26 and 27 of the transverse air flow directing arrangement 24 in this example embodiment comprises a set of spaced apart air directing elements in the form of blades or flanges 94a and 94b pivotably arranged about the pivoting connections 87, 88, and 89 (i.e. 87a, 87a'; 88a, 88a'; 89a, 89a', 87b, 87b'; 88b, 88b'; 89b, 89b'). Each one of the spaced apart air directing elements (in the form of blades or flanges) 94 are in this example individually pivotably arranged to the housing by corresponding vertical opposite pivoting connections 87a, 87a'; 88a, 88a'; 89a, 89a', 87b, 87b'; 88b, 88b'; 89b, 89b'. Furthermore, as shown in FIG. 4b, each set of the spaced apart air directing elements 94a and 94b is here connected by first bridging member 91a and second bridging member 91b, respectively, in order to move in a synchronized manner.

The air directing elements 94 may in general each have a rectangular cross-section and a length extending in the vertical direction z. To this end, the air directing elements 94 are configured to direct the air flow in the transverse direction Y.

Typically, each flange of the set of flanges 94 of each module 26 and 27 is configured to be adjusted between a plurality of positions by being rotationally arranged about a vertical axis, respectively. In this way, the transverse air flow directing arrangement 24 is adjusted between a plurality of positions, as seen in the transverse direction Y. Typically, the transverse air flow directing arrangement 24 is at least moveable between an outer first transverse position and an outer second transverse position, as seen in the transverse direction Y. In an example, when the arrangement 24 is adjusted along the transverse direction Y, the outer first transverse position may refer to the right position, while the outer second transverse position may refer to the left position.

Turning again to FIGS. 2a-2c, 3 and 4a-4d, the device according to the example embodiments here comprises a first linkage assembly 34a and a second linkage assembly 34b.

As shown in e.g. FIG. 2a, the first part 32a of the user-actuated manual mechanism 32 is operatively connected to the first transverse air flow module 26 by means of the first linkage assembly 34a. Analogously, the second part 32b is connected to the second transverse air flow module 27 by means of the second linkage assembly 34b. The first linkage assembly 34a and the second linkage assembly 34b are typically separate parts of the device. However, in some examples, the first linkage assembly 34a and the second linkage assembly 34b may be interconnected to each other, although movable in relation to each other.

In addition, by way of example only, the first linkage assembly 34a may resemble the form of a fork or the like, as shown in FIGS. 2a-2c and 4a. Hence, the first linkage assembly here includes two members 81a, 82a, which are arranged in a fork-like configuration. Analogously, the second linkage assembly 34b may resemble the form of a fork or the like, as shown in FIGS. 2a-2c and FIG. 4a. Hence, the second linkage assembly here includes two members 81b, 82b, which are arranged in a fork-like configuration.

The first linkage assembly 34a and the second linkage assembly 34b can be connected to the first transverse air flow module 26 and the second transverse air flow module 27, respectively, in several different ways. By way of example, as shown in the FIGS. 2a-2c, 3 and 4a-4d, the first linkage assembly 34a is operatively connected to the first part 32a of the user-actuated manual mechanism 32 at one end 58a (see FIG. 2c) and further configured to define a channel or groove 35a to accommodate a part of a guiding member 25a of the transverse air flow module 26. In other words, the first linkage assembly 34a comprises the channel or the groove 35a. Analogously, the second linkage assembly 34b is operatively connected to the second part 32b of the user-actuated manual mechanism 32 at one end 58b and further configured to define a channel or groove 35b to accommodate a part of a guiding member 25b of the transverse air flow module 27. In other words, the second linkage assembly 34b comprises the channel or the groove 35b.

In this example, the channel or groove 35a extends at least partly in the longitudinal direction X to permit movement of the first linkage assembly 34a along the longitudinal direction X independently of the position of the vertical air flow directing arrangement 22 and the position of the transverse air flow directing arrangement 24, while an adjustment of the first and second transverse air flow modules 26, 27 of the vertical air flow directing arrangement 24 is effected by a movement of the first and second linkage assemblies 34a, 34b in the transverse direction Y, respectively. Analogously, the channel or groove 35b extends at least partly in the longitudinal direction X to permit movement of the second linkage assembly 34b along the longitudinal direction X independently of the position of the vertical air flow directing arrangement 22 and the position of the transverse air flow directing arrangement 24, while an adjustment of the first and second transverse air flow modules 26, 27 of the vertical air flow directing arrangement 24 is effected by a movement of the first and second linkage assemblies 34a, 34b in the transverse direction Y, respectively.

If the first linkage assembly and/or the second linkage assembly include the members 81, 82 to form a fork like configuration, the guiding member 25 is oriented essentially in the vertical direction and arranged to freely move in-between the two members 81, 82 except in the transverse direction Y. This type of configuration is applicable to both linkage assemblies.

In general, each one of the guiding members 25a, 25b is arranged on the transverse air flow directing arrangement 24. The guiding member may as an example be provided in the form of a thin member having a rectangular cross-section and a length in the vertical direction z, when seen in an assembled configuration of the device. The guiding members 25a, 25b can be integral parts of the transverse air flow directing arrangement 24 as shown in FIGS. 2a-2c. Alternatively, the members 25a, 25b can be provided in the form of separate parts connected to the transverse air flow directing arrangement 24 in a vertical orientation. The cross-section of the members 25a, 25b may alternatively be circular. The guiding members 25a, 25b are each configured to cooperate with corresponding recesses 35a, 35b of the first and second linkage assemblies so as to effect a movement of the transverse air flow directing arrangement 24 by a movement of the first and second linkage assemblies in a transverse direction Y, while maintaining the position of the transverse air flow directing arrangement 24 upon a movement of the first and second linkage assemblies along the longitudinal direction X. This is due to that the guiding members 25a, 25b are each freely movable in the corresponding recesses 35a, 35b along the direction X.

Typically, although not strictly required, the vertical air flow adjustment arrangement 22 is separately pivotably connected to the housing 11 and configured to adjust the direction of the air flow in the vertical direction Z, while the transverse air flow directing arrangement 24 is separately pivotably connected to the housing 11 and configured to adjust the direction of the air flow in a transverse direction Y. Accordingly, the device as shown in the figures here comprises the vertical air flow adjustment arrangement 22 for adjusting the air flow in the vertical direction Z and the transverse air flow directing arrangement 24 for adjusting the air flow in the transverse direction Y. It is to be noted that typically, although not strictly required, the vertical air flow directing arrangement 22 and the transverse air flow directing arrangement 24 in this example embodiment, as described in relation to the FIGS. 1, 2a-2c, 3, 4a-4c, 5 and 6a-6c, are separate components and spaced apart as seen in the longitudinal direction X.

As will be further described herein, the device also generally, although not strictly necessary comprises a shut-off mechanism 40 configured to regulate the air flow. In this example embodiment, as shown in FIGS. 2a to 2c, the shutoff mechanism 40 is configured to regulate the air flow. Typically, the shutoff mechanism is pivotably connected to the housing 11. Alternatively, or in addition, the shutoff mechanism may be connected to the housing 11 via a third linkage assembly 36, as further described below.

Turning now to the vertical air flow directing arrangement 22, as mentioned briefly above and illustrated in e.g. FIGS. 1, 2a-2c, the vertical air flow directing arrangement 22 here comprises a first module 20 and a second module 21. The first module 20 is configured to move relative the second module 21 along the longitudinal direction X. In addition, the user-actuated manual mechanism 32 is slidably engaged to the first module and configured to be movable along the transverse direction Y relative the first module 20 upon operation of a user. In other words, each one of the parts 32a and 32b of the mechanism 32 is slidably engaged to the first module and configured to be movable along the transverse direction Y relative the first module 20 upon operation of a user.

It is to be noted, however, that the first and second modules 20, 21 of the vertical air flow directing arrangement 22 are only optional components of the configuration of the example embodiments of the device, thus not strictly necessary.

Now turning to e.g. FIG. 2c, the configuration of a movable arrangement between the first module and the second module is provided, as an example, by an interconnecting member 28 provided with a recess 39a for accommodating a guiding pin 79a of the first module. Hence, in this example embodiment, the vertical air flow directing arrangement 22 further comprises an interconnecting member 28 for operatively connecting the first module 20 and the second module 21 of the vertical air flow directing arrangement 22. The guiding pin projects from the first module of the vertical air flow directing arrangement. In addition, the interconnecting member 28 includes the recess 39a for accommodating the guiding pin 79a of the first module to permit the first module to move relative the second module along the longitudinal direction X. The recess 39a has a substantial extension in the longitudinal direction. Thus, the first module comprises the guiding pin 79a, as shown in FIG. 2c.

Due to the configuration, arrangement and cooperation between the guiding pin 79a of the first module and the recess 39a of the interconnecting member 28, the movement of the first module in the vertical direction (about a transverse axis) is transferred to a movement of the second module in the vertical direction (about a transverse axis). Thus the movement in the vertical direction of the first module effects the movement of the second module in the vertical direction. However, due to the longitudinal extension of the recess 39a, the first module is allowed to move in the longitudinal direction without effecting the movement of the second module in the longitudinal direction.

As mentioned above, the device also comprises the shut-off mechanism 40 configured to regulate the air flow. Moreover, as shown in FIGS. 2a-2c, 3 and 4a-4d, the device in this example comprises a third moveable linkage assembly 36. The third moveable linkage assembly 36 is operatively connected to the user-actuated manual mechanism 32 and configured to effect a regulation of the air flow via the shutoff mechanism 40 by a movement of the user-actuated manual mechanism 32 along the longitudinal direction X. The third linkage assembly 36 is here operatively connected to the user-actuated manual mechanism 32 via the first module of the vertical air flow directing arrangement 22. In addition, the third linkage assembly 36 is hereby configured to effect a regulation of the air flow by the shutoff mechanism 40 by a movement of the user-actuated manual mechanism 32 along the longitudinal direction X. The third linkage assembly 36 is operatively connected to the user-actuated manual mechanism 32 via a connecting pin 20a disposed on the first module, as shown in FIG. 2c. In other words, the connecting pin 20a is arranged to extend through an opening of the third linkage assembly. As such, the connecting pin 20a is arranged to extend through an opening of a guiding member 37. To this end, the connecting pin 20a is pivotally connected to the third linkage assembly and the housing. Thus, the first module is arranged to freely rotate about the transverse axis AT and within the third linkage assembly opening.

As illustrated in e.g. FIG. 2b, the third linkage assembly 36 is connected to an outer side area 78a of the first module 20 of the vertical air flow directing arrangement 22. In the example embodiment illustrated in the Figures, e.g. FIG. 2b, the third linkage assembly 36 is configured to operatively connect to the connecting pin 20a projecting from the first module 20 of the arrangement 22. In this manner, the third linkage assembly 36 is capable of moving along the longitudinal direction X by means of cooperation between the connecting pin 20a and the third linkage assembly opening, i.e. an opening of the guiding member 37.

To this end, the guiding member 37 comprises an opening 37a for receiving the connecting pin 20a.

One example of a configuration of the third linkage assembly 36 is illustrated in e.g. FIGS. 2a and 2b. The third linkage assembly is typically configured to adjust the position of the shutoff mechanism upon a movement of the third linkage assembly 36 in the longitudinal direction X, and further configured to remain in position, as seen in the longitudinal direction X, upon an adjustment of any one of the first and second linkage assemblies 34a, 34b in the transverse direction Y and/or in the vertical direction Z. As an example, the third linkage assembly 36 here comprises a movable extended linkage member 38 and the guiding member 37 connected to the housing. In other words, the arrangement 22 is here connected to the housing via the guiding member 37. The extended linkage member 38 is adapted at a first end to cooperate with the guiding member 37 and at a second end to cooperate with the shutoff mechanism so that a movement of the first module of the vertical air flow directing arrangement 22 is transferred into a movement of the third linkage member 36 along the longitudinal direction X to effect a regulation of the air flow by the shutoff mechanism 40 independently of the position of the transverse air flow directing arrangement 24. As an example, the movable extended linkage member 38 is adapted at a first end to cooperate with the guiding member 37 by being operatively connected to each other via the connecting pin 20a of the arrangement 22. Thus, the linkage member 38 here includes an opening 38a for receiving the connecting pin 20a. Similarly, the guiding member 37 includes the opening 37a for receiving the connecting pin 20a. The length of the connecting pin 20a, as seen in the transverse direction Y should thus be at least sufficient to accommodate the guiding member 37 and the linkage member 37. However, the movable extended linkage member 38 can be adapted at a first end to cooperate with the guiding member 37 in other ways, e.g. by a separate connecting member, or the like, forming a functional connection between the member 38 and the member 37 so that the third linkage assembly moves upon a movement of the user-actuated manual mechanism 32 along the longitudinal direction X.

As further described herein, the movable extended linkage member 38 of the third assembly 36 can be adapted at the second end to cooperate with the shutoff mechanism 40 by means of a plurality of serrations 97a configured to cooperate with a plurality of serrations of the shutoff mechanism 40, as shown in e.g. FIGS. 2a and 2b.

Typically, although not strictly required, the guiding member 37 is configured to allow for a displacement of the first module along the transverse direction Y. As an example, this is provided by having a guiding recess 17 in the guiding member 37 configured to cooperate with a sliding surface 19 of the housing 11, as illustrated 2a. Further, the width of the guiding recess in the transverse direction Y is bigger than the width of the sliding surface 19 as seen in the transverse direction Y.

As is shown in FIGS. 2a and 2b, the connecting pin 20a of the arrangement 22 is configured to operatively connect the movable extended linkage member 38 and the guiding member 37 to the housing.

It is to be noted that the device may also comprise a fourth linkage assembly 33, as shown in e.g. FIGS. 2a-2c, which typically is provided with the same features and functions as the third linkage assembly except that the fourth linkage assembly is arranged on another side of the first module. In this context, it should be readily appreciated that all features, functions and effects of the second linkage assembly may likewise be incorporated in the fourth linkage assembly. The fourth linkage assembly will also be further described below.

Similar to the configuration of the first and second linkage assemblies, the third linkage assembly 36 is movably arranged in the housing 11. Analogously, the fourth linkage assembly is movably arranged in the housing. Further, due to configuration of the third linkage assembly, as described above, the third linkage assembly will remain in position upon a movement of the vertical air flow adjustment arrangement 22 in the vertical direction Z and/or a movement of first and second linkage assemblies 34a, 34b (and the transverse air flow directing arrangement 24) in the transverse direction Y. Thus, the first and second linkage assemblies 34a, 34b and also the user-actuated manual mechanism 32 are allowed to move in the transverse direction Y and in the vertical direction Z independently of the position of the shutoff mechanism 40 and the third linkage assembly 36, while a movement of the user-actuated manual mechanism 32 in the longitudinal direction X is translated into a movement of the third linkage assembly 36 in the longitudinal direction X to effect a regulation of the air flow by the shutoff mechanism 40 independently of the position of the air flow arrangement 22 and the first and second linkage assemblies 34a, 34b. This function is likewise applicable to the fourth linkage assembly 33 relative to the first and second linkage assemblies 34a, 34b.

As the third linkage assembly 36 is here operatively connected to the user-actuated manual mechanism 32 via the first module 20, which is arranged movable relative to the second module 21 of the vertical air flow directing arrangement 22 and configured to effect a regulation of the air flow by the shutoff mechanism 40 by a movement of the user-actuated manual mechanism 32 along the longitudinal direction X, the regulation of the air flow by the shutoff mechanism 40 can be performed independently of the position of the transverse air flow arrangement 24 and independently of the position of the vertical air flow adjustment arrangement 22 as seen in the vertical Z and the transverse direction Y. In other words, due to configuration of the third linkage assembly and also the configuration of the first and second linkage assemblies 34a, 34b, which allows the guiding members 25a, 25b of the transverse air flow directing arrangement 22 to freely move in the longitudinal direction X of the recess 35a, 35b of the first and second linkage assemblies 34a, 34b, only the regulation of the air flow by the shutoff mechanism is effected by a movement of the third linkage assembly, the user-actuated manual mechanism and the first module along the longitudinal direction X. It this context, it is to be noted that a movement of the first module 20 of the vertical air flow adjustment arrangement 22 in the longitudinal direction X is translated into a movement of the third linkage assembly 36 to effect a regulation of the air flow by the shutoff mechanism 40. A movement of these components along the longitudinal direction X can thus be performed independently of the position of the transverse air flow directing arrangement 24 and the first and second linkage assemblies 34a, 34b.

In addition, the position of the shutoff mechanism 40 is unaffected by an adjustment of the transverse air flow directing arrangement 24. Also, the position of the shutoff mechanism 40 is unaffected by an adjustment of the vertical air flow directing arrangement 22 in the vertical direction Z. That is, by an adjustment of the first and second linkage assemblies 34a, 34b along the transverse direction Y and/or by an adjustment of the user-actuated manual mechanism about the transverse axis AT. In other words, the shutoff mechanism 40 is maintained in its position upon a movement of the first and second linkage assemblies 34a, 34b in the vertical direction Z, since the connecting pin 20a of the first module 22 is arranged to freely rotate about the transverse axis AT and within the third linkage assembly openings 37a and 38a.

As the user-actuated manual mechanism 32 is slidably engaged to the first module of the vertical air flow directing arrangement 22, it becomes possible only to move the first linkage assembly 34a along the transverse direction Y (by moving the first part 32a of the user-actuated manual mechanism 32 in the transverse direction Y) without adjusting the position of the shutoff mechanism 40. Analogously, it becomes possible only to move the second linkage assembly 34b along the transverse direction Y (by moving the second part 32b of the user-actuated manual mechanism 32 in the transverse direction Y) without adjusting the position of the shutoff mechanism 40.

Accordingly, the configuration of the first linkage assembly 34a, the second linkage assembly 34, and the third linkage assembly 36 enable that the first and second linkage assemblies 34a, 34b are freely movable along the transverse direction Y in relation to the third linkage assembly 36. Hence, the shutoff mechanism 40 and the third linkage assembly 36 are maintained in position upon a movement of the first and second linkage assemblies 34a, 34b in the transverse direction Y.

Moreover, in this example embodiment, as is shown in FIG. 1, the user-actuated manual mechanism 32 is configured to permit manual operation of the air flow directing arrangements 22 and 24 and the shutoff mechanism 40 from the outside of the device. Typically, the user-actuated manual mechanism 32 is arranged downstream of the vertical air flow directing arrangement 22. However, it is to be noted that the user-actuated manual mechanism 32 may be partly located within the arrangement 22 when the first module 20 is moved relative the second module 21 in the direction X.

In this context, the outside of the device here refers to the outside of the second side 62, as seen in the longitudinal direction X.

As mentioned above, downstream here refers to a position along the horizontal direction x (longitudinal direction) of the device. Typically, the air flow directing arrangements 22 and 24 are arranged downstream of the shutoff mechanism 40.

In the example embodiment, the third linkage assembly 36 is movably arranged in the device along the longitudinal direction X such that a movement of the shutoff mechanism 40 is effected by a movement of the user-actuated manual mechanism 32 in the longitudinal direction X, an adjustment of the vertical air flow adjustment arrangement 22 is effected by a movement of the user-actuated manual mechanism 32 in the vertical direction Z and an adjustment of the transverse air flow directing arrangement 24 is effected by a movement of the user-actuated manual mechanism 32 in the transverse direction Y. That is, the first and second parts 32a, 32b of the user-actuated manual mechanism 32 are configured to permit manual operation of the vertical air flow adjustment arrangement 22, while the first part 32a and the second part 32b are further configured to permit manual operation of the first transverse air flow module 26 and the second transverse air flow module 27, respectively.

To this end, a transverse adjustment of the air flow via adjustment of the transverse air flow directing arrangement 24 is effected by a movement of the user-actuated manual mechanism 32 in the transverse direction Y. Thus, a vertical adjustment of the air flow via the vertical air flow adjustment arrangement 22 is effected by a movement of the user-actuated manual mechanism 32 in the vertical direction Z. In addition, as described herein, any one of the vertical air flow adjustment arrangement 22 and the transverse air flow directing arrangement 24 and the shutoff mechanism 40 can be independently operated within the device. Hence, the device also provides a multi-functional solution which is both compact and robust while allowing for an integrated push/pull function via the user-actuated manual mechanism 32 being operable from the outside of the device as seen in the longitudinal direction X.

As mentioned above, the user-actuated manual mechanism 32 may be slidably engaged to the vertical air flow directing arrangement 22 and configured to be movable along the longitudinal direction X and the transverse direction Y upon operation of a user. In this example embodiment, as described in relation to FIGS. 1 and 4a-4d, the user-actuated manual mechanism 32 is slidably engaged to the first module 20 of the vertical air flow directing arrangement 22 and movable along the longitudinal direction X and the transverse direction Y upon operation of a user. As an example, the user-actuated manual mechanism 32 can be slidably arranged on a flange 92 of the first module of the vertical air flow adjustment arrangement 22. A slidably arrangement between two components can be provided in several different ways, e.g. by means of two frictional surfaces. In this example embodiment, the user-actuated manual mechanism 32 includes a recess for slidably engaging with a surface of a flange of the first module of the vertical air flow adjustment arrangement 22. Typically, as shown in the figures, the user-actuated manual mechanism 32 is slidably arranged on the centre flange 92. The centre flange 92 comprises a cut-out or a recess adapted to define the transverse outermost positions of the slidable movement of the user-actuated manual mechanism 32. In other words, the user-actuated manual mechanism 32 and the first module 20 of the vertical air flow directing arrangement 22 are configured to define the maximum extension of the movement of the user-actuated manual mechanism 32 in the transverse direction Y. As such, in this example of the device, the user-actuated manual mechanism 32 is movable in-between outermost transverse positions. The outermost transverse positions of the user-actuated manual mechanism 32 are typically defined by the recess or cut-out in the centre flange 92. Thus, the outermost transverse positions are here disposed on the first module of the vertical air flow directing arrangement. However, this type of arrangement is well-known in the art, and is therefore not further described herein. Typically, although not strictly required the user-actuated manual mechanism 32 is assembled with the first and second linkage assemblies 34a, 34b to form a closed configuration about the flange of the first module 20, as illustrated in e.g. FIG. 2c in conjunction with FIG. 4a.

Typically, the user-actuated manual mechanism 32 is slidably engaged to the vertical air flow adjustment arrangement 22 and configured to permit operation of the user-actuated manual mechanism 32 along the longitudinal direction X and the transverse direction Y, upon operation of a user, independently of the position of the vertical air flow adjustment arrangement 22, while an adjustment of the vertical air adjustment mechanism 22 is effected by a movement of the manual mechanism 32 in the vertical direction Z. In this example embodiment, a movement of the user-actuated manual mechanism 32 in the vertical direction Z corresponds to an inclination of the mechanism 32 about a transverse axis AT, as shown in e.g. FIG. 2b. Thus, the user-actuated manual mechanism 32 is typically operatively connected to the first and second linkage assemblies 34a, 34b to permit a pivoting of the user-actuated manual mechanism 32 about the transverse axis AT.

In this example embodiment, the first and second linkage assemblies 34a, 34b are here located essentially in a central region in the device, as seen in the directions X, Y, and Z.

In a configuration as shown in the Figures, in which the vertical air flow directing arrangement 22 includes the first module 20 and the second module 21, the vertical air flow adjustment arrangement 22 is independently pivotably connected to the housing 11 via at least one pivoting connection 68a and 68b. The pivoting connection is configured to permit the vertical air flow directing arrangement 22 to pivot about a transverse pivot axis ATP. Typically, the pivoting connection includes a set of pivoting points at opposite vertical sides of the arrangement 22, as shown in FIG. 2c. Although strictly not necessary, the vertical air flow directing arrangement 22 is here independently pivotably connected to the housing 11 via a plurality of pivoting connections 68a, 68b, 69a and 69b. As an example, the pivoting connections may include a set of two pivoting connections arranged spaced apart, as shown in e.g. FIG. 2c. In addition, the pivoting points of the pivoting connections are arranged on opposite vertical sides of the mechanism 22. Typically, although not strictly necessary, each one of the first module 20 and the second module 21 is provided with a set of opposite arranged pivoting connections.

Referring again to FIG. 1 and FIGS. 2a-2c the vertical air flow directing arrangement 22 in this example embodiment comprises a set of spaced apart air directing elements in the form of blades or flanges 92 pivotably arranged about the pivoting connections 68 and 69. The set of the spaced apart air directing elements (in the form of blades or flanges) 92 may be pivotably arranged about one single pivoting connection in the form of one module. Alternatively, as shown in FIG. 1 or 2a-2c, the set of spaced apart air directing elements, in the form of blades or flanges 92, can be arranged individually about a number of spaced apart pivoting connections 68 and 69. The first module is typically pivotally connected to the housing by the connecting pin 20a and 20b, respectively. The second module is typically pivotally connected to the housing by the pivoting connections 68a, 68b, 69a and 69b, respectively. The air directing elements 92 may in general each have a rectangular cross-section and a length extending in the transverse direction Y. To this end, the air directing elements 92 are configured to direct the air flow in the vertical direction Z.

Typically, each flange of the set of flanges 92 is configured to be adjusted between a plurality of positions by being rotationally arranged about a transverse axis, respectively. In this way, the vertical air flow directing arrangement 22 is adjusted between a plurality of positions, as seen in the vertical direction Z. Typically, the vertical air flow adjustment arrangement 22 is at least moveable between an outer first position and an outer second (upper) position, as seen in the vertical direction Z. In an example, when the arrangement is adjusted along the vertical direction Z, the outer first position may refer to the lower position, while the outer second position may refer to the upper position. Typically, although not strictly necessary, each one of the first module 20 and the second module 21 is provided with at least one flange configured to be adjusted between a plurality of positions.

As mentioned above, the shut off mechanism is configured to open and close the air flow, i.e. regulate the air flow, by means of the shut off mechanism 40. In addition, the vertical air flow directing arrangement in some design variants includes the first module and the second module, in which the first module is movably arranged relative to the second module in the longitudinal direction X. However, as both the first module and the second module are also adjustable in the vertical direction (or rotatably arranged about a transverse axis), it might sometimes occur that the first module accidently contact the second module when the first module is moved in relation to the second module in the longitudinal direction when the flange(s) of the first module is angled. This may occur when the first module is pushed into the housing, as seen in the longitudinal direction X. In order to further improve the functionality of the first air flow arrangement, the arrangement in one example embodiment further comprises an alignment member 93.

Figure 6A:
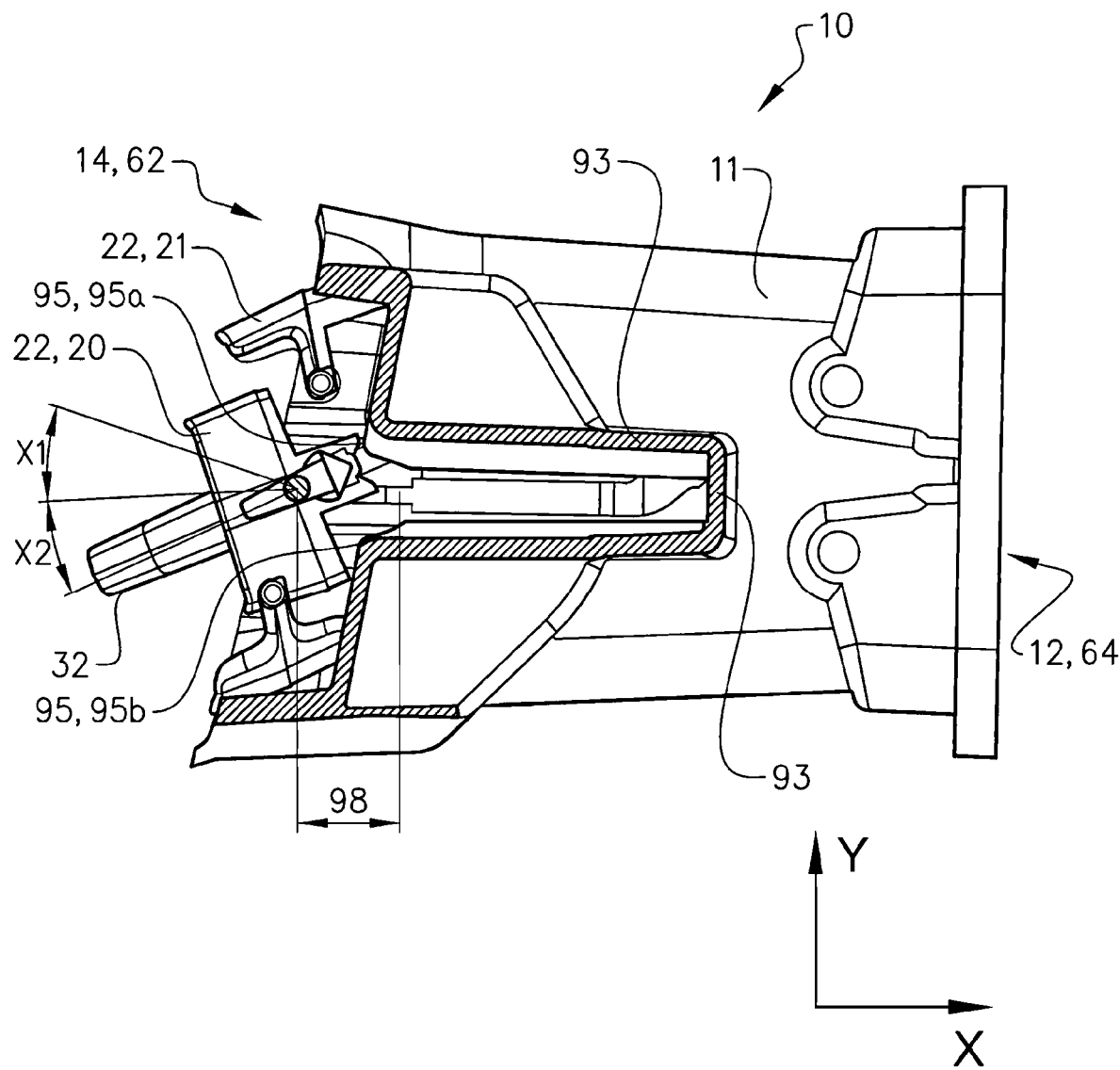
FIGS. 6a-6c schematically illustrate further parts of a vertical air flow directing arrangement of an air nozzle device according to an example embodiment of the present invention.
Figure 6B:
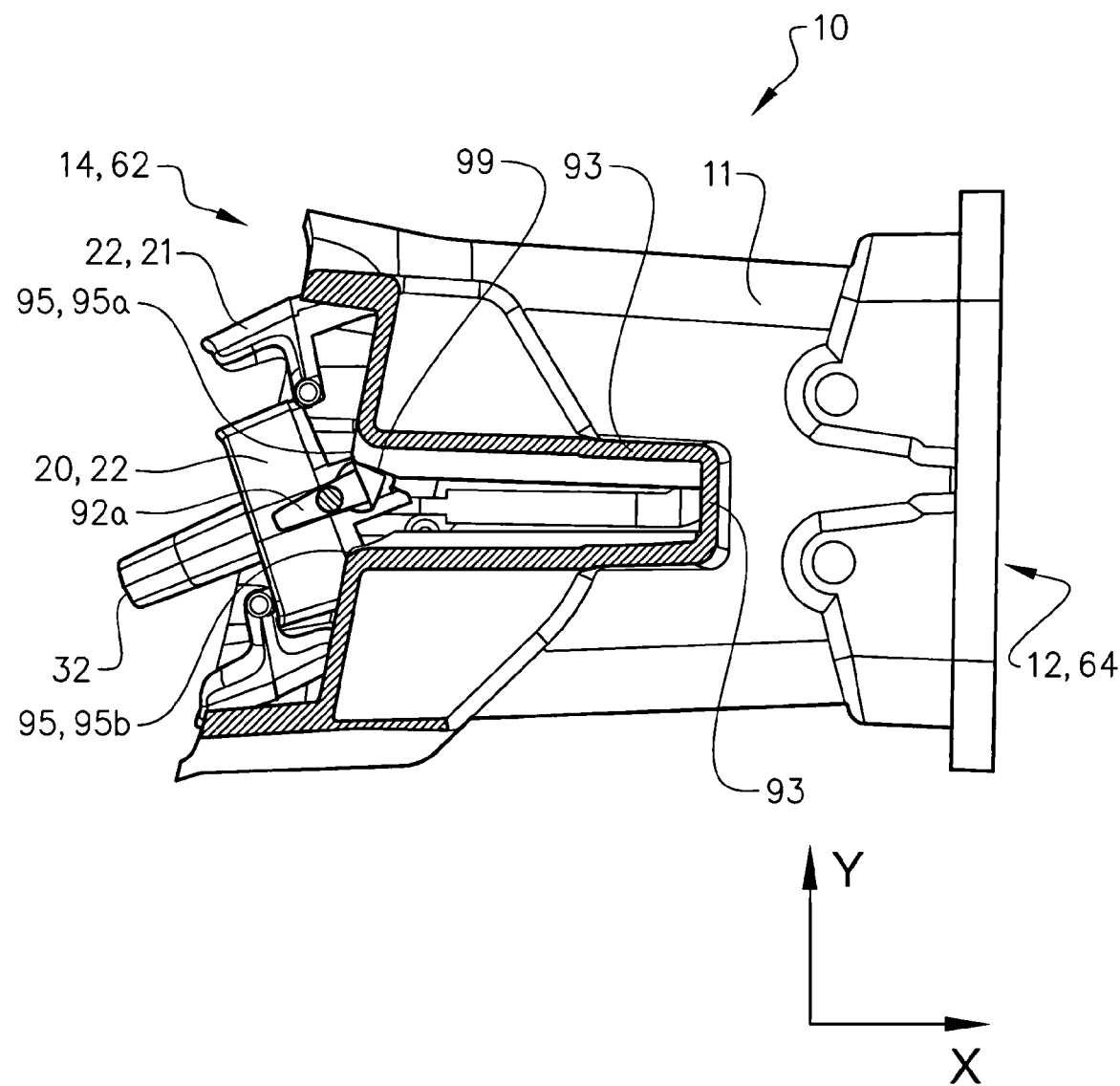
Figure 6C:
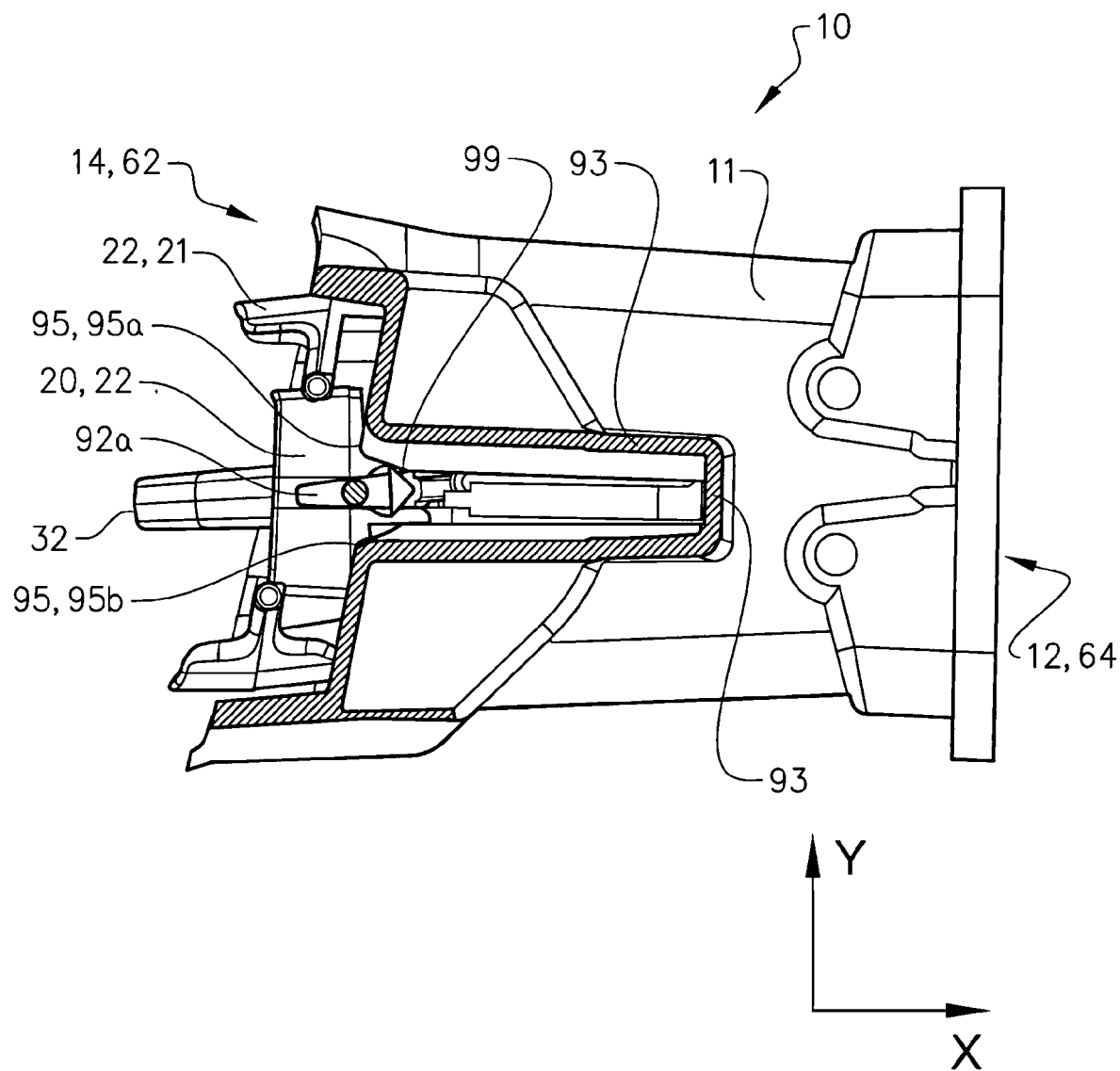

As shown in FIGS. 6a-6c, the alignment member 93 comprises a guiding surface 95 configured to engage with a corresponding guiding surface 99 on the first module 20. Thus, the first module here comprises a centre air directing elements 92a (centre flange) having a guiding surface 99. The air directing elements 92 are in this example horizontal flanges for directing and adjusting the air in the vertical direction Z, as shown in the FIGS. 6a-6c. FIG. 6a-6c are cross sectional views of the device illustrating the alignment member 93 and the first module 20, when the vertical air flow directing arrangement 22 is in an angled position. As mentioned above, the user-actuated manual mechanism 32 is configured to open/close the shutoff mechanism 40 via a movement of first module 20 relative to the second module 21 to effect a movement of the third linkage assembly 36 along the longitudinal direction X.

As an example, the guiding surface 95 defines a curvature for aligning the flange(s) of the first module in a horizontal alignment with the flange(s) of the second module. Typically, the guiding surface defines a curvature for aligning the flanges of the first module into the nominal position, i.e. in parallel with a horizontal line of the device (as seen when the device is arranged in an essentially horizontal orientation).

In general, a nominal position of the vertical air flow directing arrangement 22 refers to a position when the air directing flanges of the arrangement are in parallel with the XY-plane of the device (as seen when the device is arranged in an essentially horizontal orientation). Analogously, a nominal position of the transverse air flow directing arrangement 24 refers to a position when the air directing flanges of the arrangement are in parallel with the XZ-plane of the device.

In the example shown in FIGS. 6a-6c, the guiding surfaces shape is formed by opposite arranged inclined (or curved) surfaces 95a and 95b. The operation of the first module and the alignment member can be further described by the following example in conjunction with FIGS. 6a-6c. In this context, it is to be noted that when the air flow is closed by setting the shutoff mechanism 40 in a closed state, the first module 20 of the air flow arrangement 22 is positioned in a location closer to the shutoff mechanism, as seen in the longitudinal direction X, than when the shutoff mechanism is in the open position. Typically, when the shutoff mechanism is in the open state, the first module 20 is essentially flash with the second module 21, as seen in the vertical direction. In the open position of the shutoff mechanism, air is allowed to flow through the air passage. In this position, vertical adjustment of the air flow is permitted by adjusting the air directing elements 92 of the arrangement 22. By way of an example, the air directing elements, illustrated by the centre air directing element 92a in FIG. 6a, may be adjusted with an angle α. The air directing element 92a is here adjusted about the transverse axis AT. As an example, the air directing element 92 can be varied upwardly from about 0-40 degrees. As an example, the air directing element 92 can be varied downwardly from about 0-30 degrees. However, other levels or ranges may be readily conceivable. As shown in FIG. 6a, α1 defines the upward angle adjustment of one air directing element 92, whilst α2 defines the downward angle adjustment of one air directing element.

By way of an example, the first module 20 is moved about 10 mm in the longitudinal direction towards the first side 64 of the air device. In this example, this corresponds to that the first module 20 is moved about 10 mm in the longitudinal direction towards the alignment member of the air device. Typically, the first air module is movable from a first position, in which the first module is essentially flush with the second module, and a second position, in which the first module is positioned closer to the shut off mechanism than the second module, as seen in the longitudinal direction X. As shown in FIG. 6a, the longitudinal distance between the first position and the second position of the first module is illustrated by the distance 98.

As mentioned above, the guiding surface 95 of the alignment member 93 has a geometry adapted to guide the centre air directing element 92a into a horizontal (i.e. nominal) position when the airflow is closed by the shut off mechanism. As an example, the guiding surface 95 of the alignment member 93 has a geometry adapted to guide the guiding surface 99 of the centre air directing element 92a into a horizontal position when the airflow is closed by the shutoff mechanism. Due to this configuration of the air flow arrangement and the alignment member of the device, it becomes possible to align the direction of the air directing elements of the first module with the direction of the air directing elements of the second module when the shutoff mechanism is set into the closed state (by moving the first module towards the shutoff mechanism, as seen in the longitudinal direction X).

As shown in FIG. 6a, the first module 20 can be aligned with the second module 21 essentially independently of the value of the angle α. Typically, although not strictly required, the alignment member 93 is fixated in the housing 11 of the device. Typically, if the guiding surface of the alignment member is a slightly curved surface, as shown in FIGS. 6a-6c, the guiding surface of the centre air directing element is essentially conical. As an example, the guiding surface of the centre air directing element is a conical-shaped surface, or at least a semi-conical shaped surface, as shown in the figures. However, other alternatives are conceivable as long as the guiding surfaces are capable of horizontally aligning the first module with the second module. That is, the guiding surfaces are adapted to horizontally aligning the air directing element(s) of the first module with the air directing element(s) of the second module.

It is to be noted that the configuration of the alignment member as described above may be installed and arranged in any one of the example embodiments of the device as described herein.

Optionally, although strictly not required, the shutoff mechanism 40 may further be connected to the housing 11. One example advantage with this configuration is that the shutoff mechanism 40 is arranged to the housing in a more secure and stable manner.

The shutoff mechanism 40 is in this example embodiment configured to move between an open position defining a passage for the air flow in the air flow channel and a closed position defining an essentially air tight configuration against (with) the inner surfaces of the housing 11, as shown in the FIGS. 2a and 2b. However, it should be readily appreciated that the shutoff mechanism can be varied and moved to a position between the open position and the closed position. Thus, the shutoff mechanism can be moved and maintained in a position between the open position and the closed position. As an example, the shutoff mechanism can be moved so that the air flow passage is essentially 50% open etc.

As an example, and as shown in FIGS. 2a-2c, the shutoff mechanism 40 thus typically, although not strictly necessary, comprises a pair of blades being moveable between the open position in which the set of blades forms a passage for the air flow in the air flow channel and the closed position in which the set of blades are adapted to form an essentially air tight configuration against the inner surfaces of the housing. Thereby, the user-actuated manual mechanism 32 is capable of open/close the shutoff mechanism 40 via a movement of the third linkage assembly 36 and the first module 20 of the vertical air flow directing arrangement along the longitudinal direction X, as illustrated in e.g. FIGS. 2a-2b.

In addition, the user-actuated manual mechanism 32 is capable of independently adjusting the direction of the air flow via the air flow directing arrangements 22, 24 while maintaining the position of the shutoff mechanism 40 by a movement of the first and second linkage assemblies 34a, 34b along the transverse direction Y. As such, the user-actuated manual mechanism 32 is capable of independently adjusting the transverse direction of the air flow via the transverse air flow directing arrangement 24 by a movement of the first and second linkage assemblies 34a, 34b along the transverse direction Y and independently adjusting the vertical direction of the air flow via the vertical air flow directing arrangement 22.

As the user-actuated manual mechanism 32 is here slidably engaged to the vertical air flow directing arrangement 22, as well as operatively connected to the first linkage assembly 34, and configured to be movable along the longitudinal direction X and the transverse direction Y upon operation of a user, it becomes possible to move the first and second linkage assemblies 34a, 34b along the transverse direction Y without adjusting the position of the shutoff mechanism 40. Accordingly, the configuration of the linkage assemblies 34a, 34b and 36 enable that the first and second linkage assemblies 34a, 34b are freely movable along the transverse direction Y in relation to the third linkage assembly 36. Hence, the shutoff mechanism 40 and the third linkage assembly 36 are maintained in position upon a movement of the first and second linkage assemblies 34a, 34b in the transverse direction Y. It is to be noted that the third linkage assembly is typically configured to adjust the position of the shutoff mechanism upon the movement of the third linkage assembly 36 in the longitudinal direction X, and further configured to remain in position, as seen in the longitudinal direction X, upon an adjustment of the first and second linkage assemblies in the transverse direction Y and/or in the vertical direction Z.

Typically, although not strictly required, the third linkage assembly 36 is operatively connected to the shutoff mechanism 40 via a gearwheel connection for effecting a rotational movement of the set of blades 96a and 96b upon a movement of the third linkage assembly 36 along the longitudinal direction X. One example embodiment of a shutoff mechanism 40 provided with this type of gearwheel arrangement 97 is shown in FIGS. 2a-2c. As is illustrated, the third linkage assembly 36 is here provided with serrations 97a (or teeth) configured to cooperate with a gearwheel 97b on the shutoff mechanism. Thereby, the shutoff mechanism is adjusted in position upon a movement of the third linkage assembly 36 via a translation of motion between the serrations 97a of the third linkage assembly 36 and the gearwheel 97b. This type of gearwheel connection is well-known in the art, and therefore not further described herein.

The shutoff mechanism may further comprise at least one shutoff mechanism pivoting connection 41a for pivotably connecting the shutoff mechanism to the housing. As illustrated in e.g. FIG. 2c, the shutoff mechanism here comprises a plurality of pivoting connection 41a-41d for pivotably connecting the shutoff mechanism to the housing.

The third linkage assembly 36 here also comprises the guiding member 37 for connecting the third linkage assembly 36 to the housing 11 to provide a fixation to the housing 11.

As mentioned above, and also shown in FIG. 2c, the third linkage assembly 36 here comprises an essentially elongated shaped member in the form of a movable extended linkage member 38. The linkage member 38 has a horizontal section essentially extending in the longitudinal direction X.

Further, as mentioned above, in all example embodiments, the user-actuated manual mechanism 32 is capable of independently controlling any one of the shutoff mechanism 40, the vertical air flow adjustment arrangement 22 and the transverse air flow directing arrangement 24 to set the air nozzle device in a desired configuration so as to allow a user to regulate and direct the air flow depending on the user's wishes.

To this end, the user-actuated manual mechanism 32 (via the third linkage assembly) is typically capable of positioning the shutoff mechanism 40 in two positions, i.e. the open position and the closed position. FIG. 2a schematically illustrates an operational state of the device, in which the shutoff mechanism 40 is in the open position, while FIG. 2b schematically illustrates an operational state of the device, in which the shutoff mechanism 40 is in the closed position. When the shutoff mechanism 40 is in the open position, the set of blades 96a and 96b are arranged parallel to the longitudinal direction X. Accordingly, when the shutoff mechanism 40 is in the closed position, the set of blades 96a and 96b are arranged perpendicular to the longitudinal direction X.

Thus, the shutoff mechanism is provided in the form of a push-pull mechanism 40. Typically, although not strictly required, the push-pull mechanism or function is provided by the shutoff mechanism together with the second linkage assembly 36 and/or the third linkages assembly.

As mentioned above, the user-actuated manual mechanism 32 is capable of independently controlling any one of the shutoff mechanism 40, the vertical air flow adjustment arrangement 22 and the transverse air flow directing arrangement 24 to set the air nozzle device in a desired configuration so as to allow a user to regulate and direct the air flow depending on the user's wishes. Accordingly, in operation, the air nozzle device is capable of regulating the air flow between a closed position to an open position in all available positions of the transverse air flow directing arrangement 24 and the vertical air flow adjustment arrangement 22. In other words, the vertical air flow adjustment and the horizontal air flow adjustment can be controlled independently of the position of the air regulation mechanism, i.e. the shutoff mechanism 40. The positions of the mechanisms and the arrangements are varied based on the movements of the user-actuated manual mechanism, as mentioned above.

As used herein, the term "independently" typically refers to the principle that one component (e.g. the vertical air flow directing arrangement), or several components, can be maintained in its position when another component (e.g. the shutoff mechanism) is adjusted via the user-actuated manual mechanism. In other words, the transverse air flow directing arrangement 24 is maintained in its position, since the guiding members 25a, 25b are each freely movable in the longitudinal direction X of the corresponding recesses 35a, 35b, when the corresponding linkage assembly 34a, 34b is moved in the longitudinal direction X. In other words, the position of the transverse air flow directing arrangement 24 is unaffected by an adjustment of the shutoff mechanism 40 by a movement of the linkage assembly 36. Further, the position of the transverse air flow directing arrangement 24 is unaffected by an adjustment of the vertical air flow adjustment arrangement 22 along the vertical direction Z since the guiding members 25a, 25b are each freely movable in the vertical direction Z of the corresponding recesses 35a, 35b.

By way of example, the shutoff mechanism 40 for regulating the air flow can be varied between the open position and the closed position, as defined above. In addition, the vertical air flow adjustment arrangement 22 for adjusting the air flow in the vertical direction Z can be varied between the outer first (lower) position and the outer second (higher) position. Further, the transverse air flow directing arrangement 24 for adjusting the air flow in the transverse direction Y can be varied between the outer first transverse (right) position and the outer second transverse (left) position. In order to set the shutoff mechanism 40 in the closed position, i.e. the set of flanges 96a and 96b forms an air-tight configuration with the inner surface of the housing as illustrated in FIG. 2b, the user-actuated manual mechanism 32 is generally pushed against the vertical air flow adjustment arrangement 22, as seen in the longitudinal direction X. By pushing the user-actuated manual mechanism 32 towards the vertical air flow adjustment arrangement 22, as seen in the longitudinal direction X, the first module 20 is moved along the longitudinal direction X (due to being movably arranged relative the second module 21). Hereby, the second linkage assembly 36 is moved in the longitudinal direction X as an effect of the movement of the first module 20 along the longitudinal direction X, which results in that the second linkage assembly 36 sets the shutoff mechanism 40 in its closed position (compare e.g. the position of the mechanism 40 in FIG. 2a with the position of the mechanism in FIG. 2b).

As may gleaned from FIGS. 2a and 2b, the shutoff mechanism 40 can also be adjusted from the closed position to the open position, while the position of the arrangement 22 and the position of the arrangement 24 are maintained, i.e. the position of the arrangement 22 and the position of the arrangement 24 are unaffected by the regulation of the air flow (an adjustment of the shutoff mechanism 40). In other words, the user-actuated manual mechanism 32 can be moved along the longitudinal direction X from a first position to a second position along the longitudinal direction X. Accordingly, it is possible to regulate the air flow via the shutoff mechanism 40 independently of the position of the vertical air flow adjustment arrangement 22 and the transverse air flow directing arrangement 24.

FIG. 2a further illustrates an operational state of the device, in which the shutoff mechanism 40 for regulating the air flow is in the open position, the vertical air flow adjustment arrangement 22 for adjusting the air flow in the vertical direction Z is in the nominal position and the transverse air flow directing arrangement 24 for adjusting the air flow in the transverse direction Y is in the nominal position.

In this type of configuration of the air nozzle device, a nominal position of the arrangement 22 typically refers to a position of the arrangement 22 that directs the air flow essentially parallel to the XY-plane.

Analogously, in this type of configuration of the air nozzle device, a nominal position of the arrangement 24 typically refers to a position of the arrangement 24 that directs the air flow essentially parallel to the XZ-plane.

Figure 5:
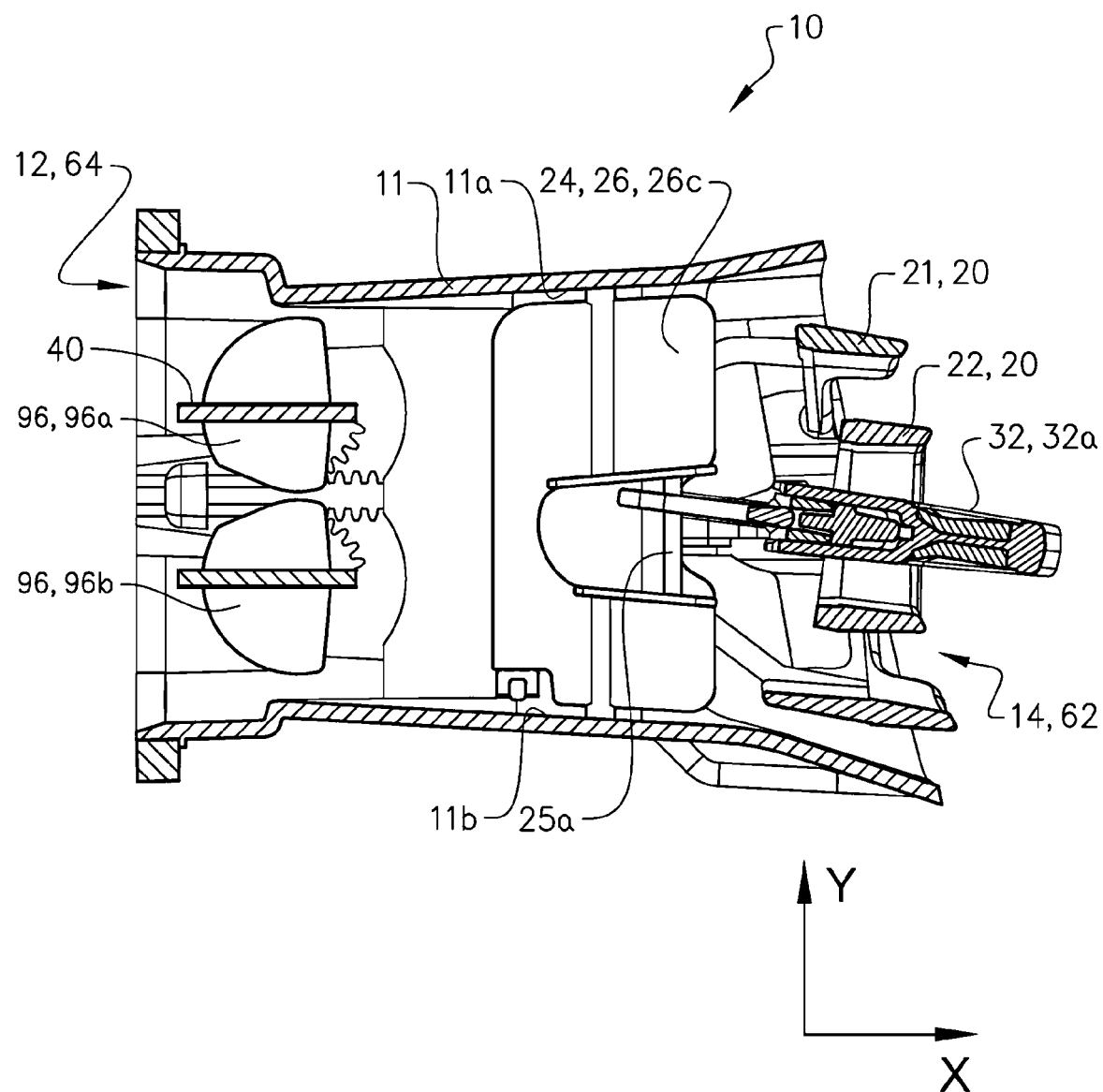
FIG. 5 is a cross sectional view along the XZ-plane illustrating the first example embodiment of the air nozzle device, in which the shutoff mechanism for regulating the air flow is in the open position, the vertical air flow adjustment arrangement for adjusting the air flow in the vertical direction Z is in an outer second (upper) position and the transverse air flow directing arrangement is in a nominal position.

Furthermore, FIG. 5 illustrates the device in an operational state in which the user-actuated manual mechanism 32 has been angled downwardly as seen in the vertical direction Z to move the vertical air flow adjustment arrangement 22 to the outer first (lower) position. In this manner, the air flow is directed downwardly. Since the user-actuated manual mechanism 32 is operatively connected to e.g. a flange of the vertical air flow adjustment arrangement 22, the adjustment of the vertical air flow adjustment arrangement 22 is changed (effected) upon a movement of the user-actuated manual mechanism 32 along the vertical direction Z. In other words, the user-actuated manual mechanism 32 is pivoting about a transverse axis.

Moreover, it is to be noted from the figures and the configuration of the device that the transverse air flow directing arrangement 24 can be adjusted independently of the position of the vertical air flow adjustment arrangement 22. That is, the transverse air flow directing arrangement 24 can be adjusted from the outer first transverse (left) position to the outer second transverse (left) position, while the position of the vertical air flow adjustment arrangement 22 can be maintained in the outer first (lower) position. Furthermore, the transverse air flow directing arrangement 24 can be adjusted independently of the position of the shutoff mechanism 40. Analogously, the vertical air flow adjustment arrangement 22 can be adjusted independently of the position of the transverse air flow directing arrangement 24. That is, the vertical air flow adjustment arrangement 22 can be adjusted from the outer first (lower) position to the outer second (upper) position, while the position of the transverse air flow directing arrangement 24 is maintained in the outer first transverse (left) position.

Furthermore, the vertical air flow adjustment arrangement 22 can be adjusted independently of the position of the shutoff mechanism 40.

It should therefore be readily appreciated from the figures, and the explanations above, that the user-actuated manual mechanism 32 is capable of independently controlling any one of the shutoff mechanism 40, the vertical air flow adjustment arrangement 22 and the transverse air flow directing arrangement 24 to set the air nozzle device in a desired configuration so as to allow a user to regulate and direct the air flow depending on the user's wishes by manipulation via the user-actuated manual mechanism 32.

As mentioned above, the device typically, although not strictly required, comprises a vertical air flow adjustment arrangement 22 for adjusting the air flow in the vertical direction Z and a transverse air flow directing arrangement 24 for adjusting the air flow in the horizontal direction X. In another example embodiment (not shown), the vertical air flow adjustment arrangement 22 and the transverse air flow directing arrangement 24 may be provided in a single unit, i.e. being integrated into one single unit. Alternatively, or in addition, the function of the vertical air flow adjustment arrangement 22 and the function of the transverse air flow directing arrangement 24 may be combined into one single unit.

It should be readily appreciated that the ultimate dimensions and the materials of the device and its components are selected based on the overall space available in the vehicle compartment, e.g. in the rear seat console. However, as an example, the components of the device can be made of a suitable plastics, a metal such as stainless steel or a combination of plastics and metal. E.g. some parts of the device can be made of metal and other parts of the device may be made by plastics.

As exemplified by the example embodiments above in relation to the Figures, the configuration of having a partition arranged in-between the first transverse air flow module and the second transverse air flow module and the provision of having a user-actuated manual mechanism comprising detachable first and second parts provide an optimized distribution of the air flow in the transverse direction for a given size of the device as compared to hitherto known air flow devices. The need for balancing the effects and functions with the size of the device is particularly important for devices installed in a thunnel console (or rear seat console) of a vehicle configured for discharging and distributing air to a row of a rear seat because the space within the thunnel console is limited, while the position of the thunnel console is typically fixed, i.e. adjacent the floor of the vehicle.

Further, as exemplified by the example embodiments above in relation to the Figures, it becomes possible to provide a multi-functional air nozzle device in the sense that the configuration of the device allows for an independent adjustment of the air flow in the vertical direction, an independent adjustment of the air flow in the horizontal direction and an independent regulation of the air flow level. To this end, the device provides a multi-functional solution which is both compact and robust, while allowing for an integrated push/pull function via the user-actuated manual mechanism that is easily operable from the outside of the device.

Figure 4D:
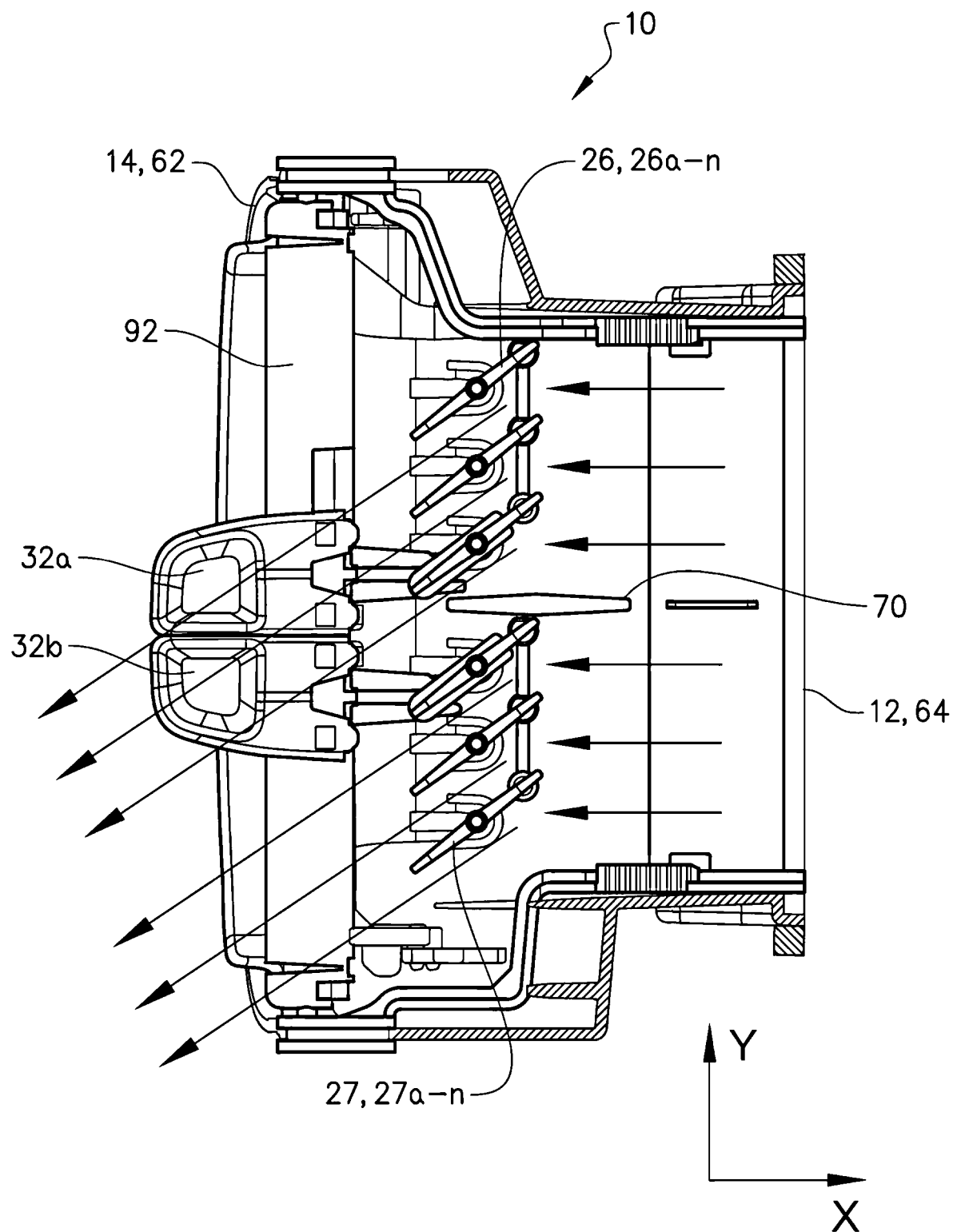

Moreover, as depicted in FIGS. 4a to 4d, which shows the air nozzle device in various operational states, the transverse air flow directing arrangement 24 comprising the two air flow modules 26, 27 for adjusting the air flow in a transverse direction Y can be adjusted into various transverse positions. In particular, as illustrated in FIG. 4d, the first transverse air flow module 26 and the second transverse air flow module 27 can be adjusted in the same direction along the transverse direction Y, thus providing an increased flow of air towards a certain region of e.g. the rear seat when desired by the user. For instance, if a passenger located in the right part of the rear seat (typically using the second transverse air flow module for ventilation), would desire an increased flow of air, the passenger may opt also to operate the other part of the user-actuated manual mechanism 32 (i.e. the first part 32a) so as to adjust the first transverse air flow module 26 in the transverse direction Y and towards the second transverse air flow module 27 (see FIG. 4d). In other words, the configuration of the two separable parts 32a, 32b of the user-actuated manual mechanism 32 being independently and operatively connected to the two air flow modules 26, 27 provides for an increased flow of air towards a certain region of e.g. the rear seat when desired by the user. As such, by the configuration of the device, it becomes possible to move each one of the first transverse air flow module 26 and the second transverse air flow module 27 in both directions along the transverse direction Y by the separable first and second parts of the user-actuated manual mechanism 32, thus providing an increased flow of air towards a certain region of e.g. the rear seat when desired by the user. As mentioned above, the adjustment of the first transverse air flow module 26 and the second transverse air flow module 27 along the transverse direction Y is typically defined by the movement of the user-actuated manual mechanism 32 in-between two outermost transverse positions. In this example, as shown in the various figures, the movement of the user-actuated manual mechanism 32 in-between the two outermost transverse positions are defined by configuration of the centre flange 92 and the design of the user-actuated manual mechanism 32. By way of example, the outermost transverse positions are disposed on the first module of the vertical air flow directing arrangement, i.e. on the centre flange 92. In the example embodiment illustrated in the figures, in particular FIG. 4d, the two separable parts 32a, 32b of the user-actuated manual mechanism 32 are adapted to be moveable across both sides of the partition 70 as seen in the transverse direction Y.

Accordingly, the adjustment of the first transverse air flow module 26 and the second transverse air flow module 27 is partly defined by possible movement of the two separable parts 32a, 32b of the user-actuated manual mechanism 32 along the transverse direction Y.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The invention claimed is:

1. Air nozzle device for a vehicle comprising a housing defining an interior volume and having an air inlet at one side, an air discharge opening at a second side and an air flow channel through the housing for transporting a flow of air between the air inlet and the air discharge opening, the device further comprising a user-actuated manual mechanism, a vertical air flow directing arrangement pivotably connected to said housing and configured to adjust the vertical direction of the air flow and a transverse air flow directing arrangement having a first transverse air flow module and a second transverse air flow module, said first transverse air flow module and said second transverse air flow module being arranged spaced apart, as seen in a transverse direction, and independently pivotably connected to said housing and configured to adjust the transverse direction of the air flow,
  wherein the device further comprises a partition arranged in-between said first transverse air flow module and said second transverse air flow module, said partition being adapted to restrict the air flow along the transverse direction,
  wherein said user-actuated manual mechanism comprises first and second parts independently and operatively connected to said first transverse air flow module and said second transverse air flow module, respectively,
  wherein any one of the first and second parts of said user-actuated manual mechanism is configured to permit manual operation of the vertical air flow adjustment arrangement, whilst said first part and said second part are further configured to permit manual operation of said first transverse air flow module and said second transverse air flow module, respectively.

2. Device according to claim 1, wherein said partition is an essentially vertical elongated member extending from an inner upper housing surface to an inner lower housing surface.

3. Device according to claim 1, wherein said partition is defined by a length extending in a horizontal direction from a position defined by the pivotable connections of said first and second transverse air flow modules to said housing and towards said vertical air flow adjustment arrangement.

4. Device according to claim 1, wherein each one of said first and second transverse air flow modules comprises a set of spaced apart air directing elements pivotably movable between transverse outermost positions upon movement of a corresponding part of said first part and said second part of said user-actuated manual mechanism, and at least one air directing element from each set of the spaced apart air directing elements is configured to establish an essentially air-tight contact with said partition when a corresponding part of said first part and said second part of said user-actuated manual mechanism is moved to an outermost position away from said partition.

5. Device according to claim 1, wherein said first part of said user-actuated manual mechanism is operatively connected to said first transverse air flow module by means of a first linkage assembly and said second part is connected to said second transverse air flow module by means of a second linkage assembly.

6. Device according to claim 5, wherein each one of said first linkage assembly and said second linkage assembly is operatively connected to said first part and said second part of said user-actuated manual mechanism, respectively, at one end and further configured to define a channel or groove to accommodate a part of a guiding member of a corresponding transverse air flow module, wherein the channel or groove extends at least partly in the longitudinal direction to permit movement of a corresponding linkage assembly along the longitudinal direction independently of the position of the vertical air flow directing arrangement and the position of the transverse air flow directing arrangement, whilst an adjustment of said first and second transverse air flow modules of said vertical air flow directing arrangement is effected by a movement of the first and second linkage assemblies in said transverse direction, respectively.

7. Device according to claim 1, wherein said vertical air flow directing arrangement comprises a first module and a second module, said first module being configured to move relative said second module along the longitudinal direction, and wherein the user-actuated manual mechanism is slidably engaged to said first module and configured to be movable along the transverse direction relative said first module upon operation of a user.

8. Device according to claim 1, further comprising a shutoff mechanism configured to regulate the air flow and a third moveable linkage assembly, wherein said third moveable linkage assembly is operatively connected to said user-actuated manual mechanism and configured to effect a regulation of the air flow via the shutoff mechanism by a movement of said user-actuated manual mechanism along the longitudinal direction.

9. Device according claim 8, wherein said third linkage assembly is operatively connected to said user-actuated manual mechanism via said first module of said vertical air flow directing arrangement and configured to effect a regulation of the air flow via the shutoff mechanism by a movement of said user-actuated manual mechanism and said first module along the longitudinal direction.

10. Device according to claim 8, wherein said third linkage assembly is configured to adjust the position of the shutoff mechanism upon a movement of the third linkage assembly in the longitudinal direction, and further configured to remain in position, as seen in the longitudinal direction, upon an adjustment of any one of the first and second linkage assemblies in the transverse direction and/or in a vertical direction.

11. Device according to claim 8, wherein said third linkage assembly comprises a movable linkage member and a guiding member connected to said housing, said linkage member being adapted at a first end to cooperate with said guiding member of said third linkage assembly and at a second end to cooperate with said shutoff mechanism so that a movement of said first module of said vertical air flow directing arrangement is transferred into a movement of said linkage member of said third linkage assembly along the longitudinal direction to effect a regulation of the air flow by the shutoff mechanism.

12. Device according to claim 7, wherein said vertical air flow directing arrangement further comprises an interconnecting member for connecting said first module and said second module of said vertical air flow directing arrangement.

13. A vehicle compartment member selected from a dashboard, a door trim, an arm rest, a thunnel console, a centre console, or a rear seat console, and comprising a device according to claim 1.

14. Vehicle compartment member according to claim 13, wherein said vehicle compartment member is a rear seat console, said device being adapted to discharge and distribute air for a row of a rear seat of a vehicle.

15. A vehicle comprising a vehicle compartment member according to claim 13.

\* \* \* \* \*